United States Patent [19]
Yamagishi et al.

[11] Patent Number: 6,084,630
[45] Date of Patent: Jul. 4, 2000

[54] MULTIMODE AND AUDIO DATA COMPRESSION

[75] Inventors: Yoichi Yamagishi; Hirokazu Takahashi, both of Yokohama, Japan

[73] Assignee: Canon Kabushiki Kaisha, Tokyo, Japan

[21] Appl. No.: 08/634,367

[22] Filed: Apr. 18, 1996

Related U.S. Application Data

[63] Continuation of application No. 08/294,605, Aug. 23, 1994, abandoned, which is a continuation of application No. 07/850,491, Mar. 12, 1992, abandoned.

[30] Foreign Application Priority Data

| Mar. 13, 1991 | [JP] | Japan | 3-048155 |
| Mar. 13, 1991 | [JP] | Japan | 3-048156 |
| Mar. 19, 1991 | [JP] | Japan | 3-054594 |
| Apr. 24, 1991 | [JP] | Japan | 3-094484 |
| Apr. 26, 1991 | [JP] | Japan | 3-097396 |
| Apr. 26, 1991 | [JP] | Japan | 3-097397 |

[51] Int. Cl.[7] ............................................. H04N 5/225
[52] U.S. Cl. .......................... 348/207; 348/220; 348/222; 386/96
[58] Field of Search ........................... 348/207, 222, 348/232, 233, 231, 230, 220, 385, 388, 384; 386/27, 39, 96, 99, 104, 101, 109; H04N 5/225

[56] References Cited

U.S. PATENT DOCUMENTS

| 4,746,993 | 5/1988 | Tada | 358/335 |
| 5,027,214 | 6/1991 | Fujimori | 358/209 |
| 5,032,918 | 7/1991 | Ota et al. | 358/209 |
| 5,032,927 | 7/1991 | Watanabe et al. | 358/335 |
| 5,063,447 | 11/1991 | Takeda | 358/145 |
| 5,081,530 | 1/1992 | Takei et al. | 358/335 |
| 5,130,812 | 7/1992 | Yamaoka | 358/335 |
| 5,164,841 | 11/1992 | Takahashi | 358/341 |
| 5,166,804 | 11/1992 | Takahashi | 358/341 |

Primary Examiner—Andrew Faile
Assistant Examiner—Tuan V. Ho
Attorney, Agent, or Firm—Fitzpatrick, Cella, Harper & Scinto

[57] ABSTRACT

A recording apparatus including an image compressor for compressing image information to be recorded; an audio compressor for compressing audio information to be recorded; a compression mode designator for designating an information compression mode; and a controller for setting the image compressor and the audio compressor at a compression operation in a relation of a predetermined correspondence therebetween according to the designation by the compression mode designator.

28 Claims, 36 Drawing Sheets

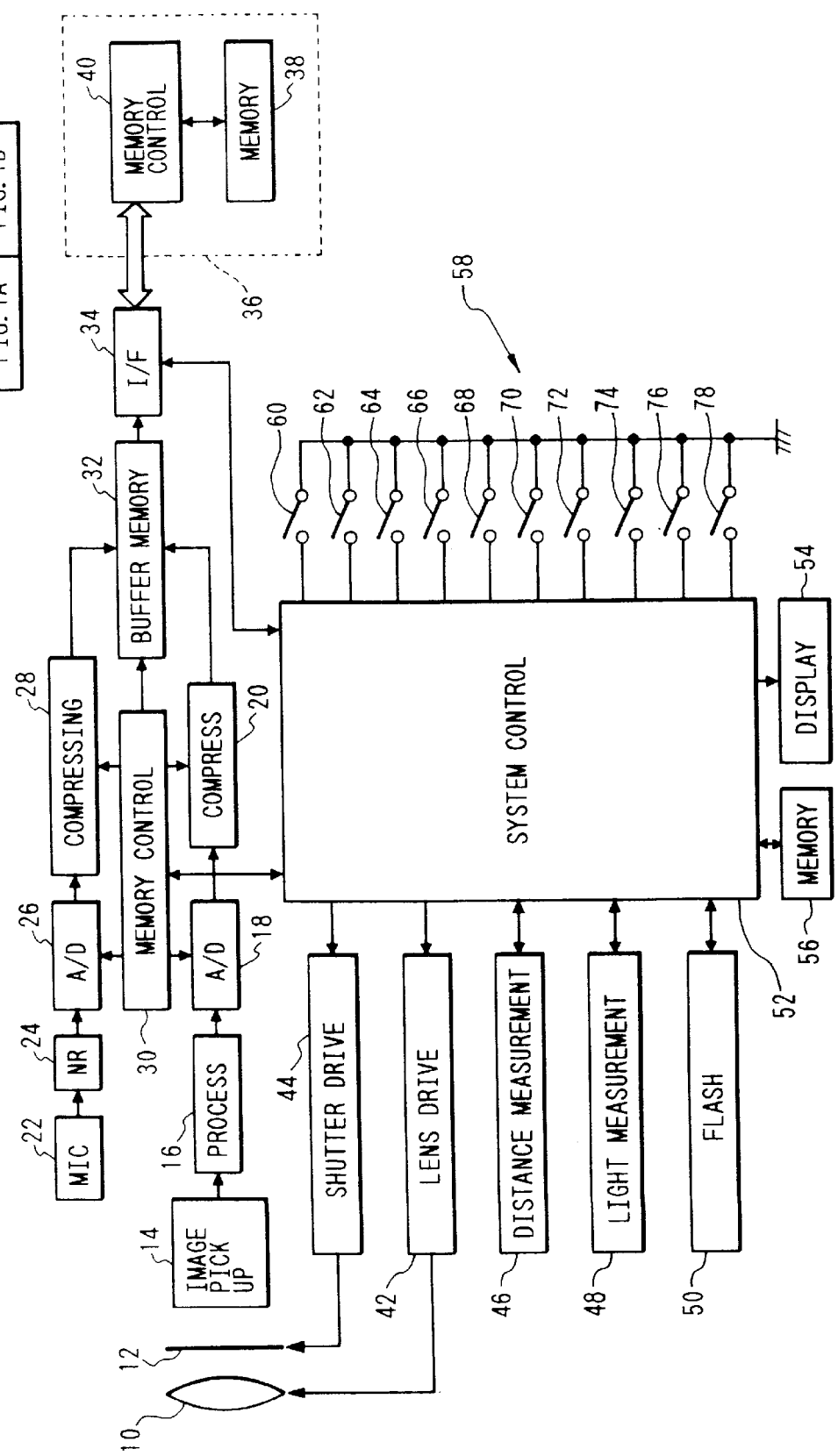

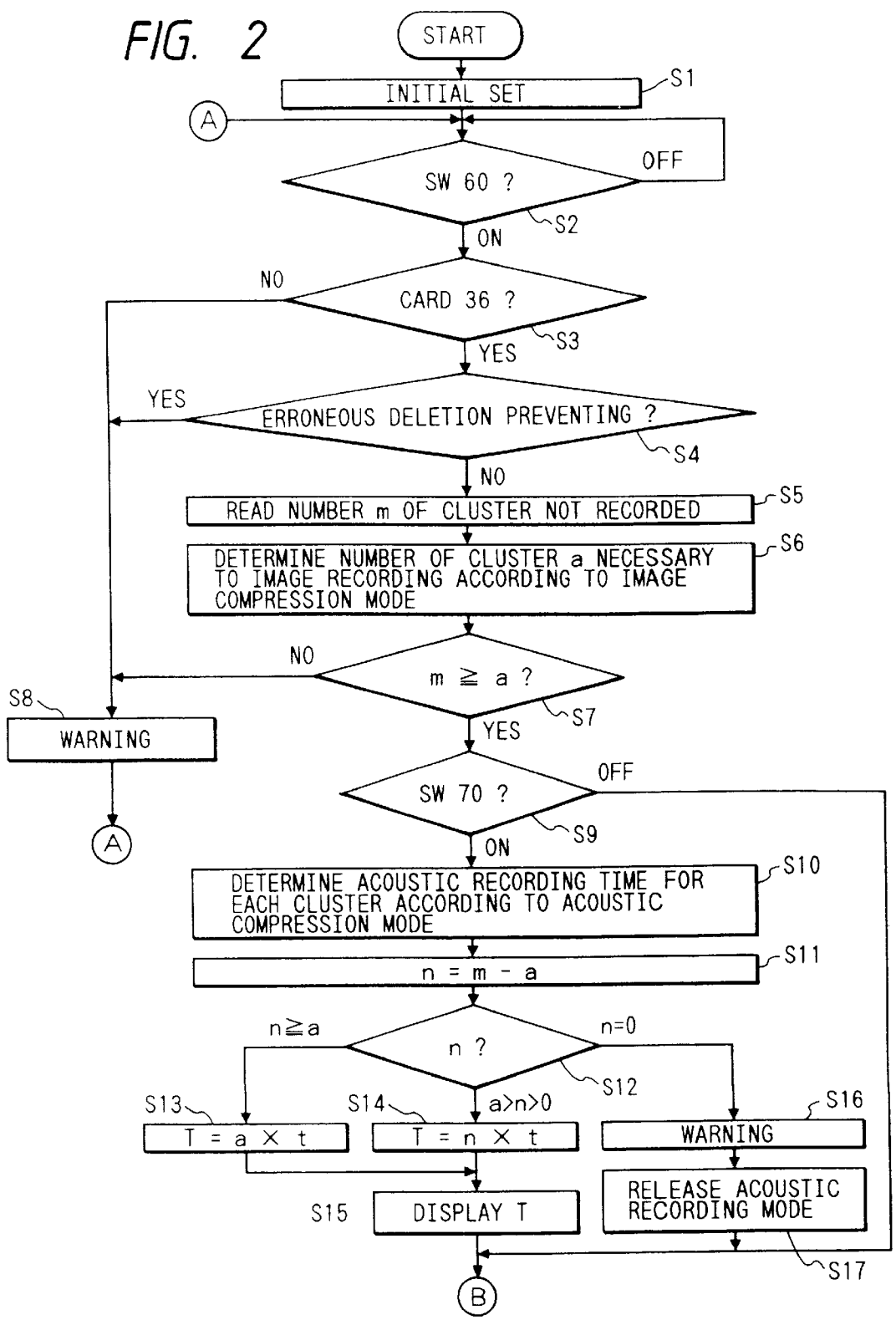

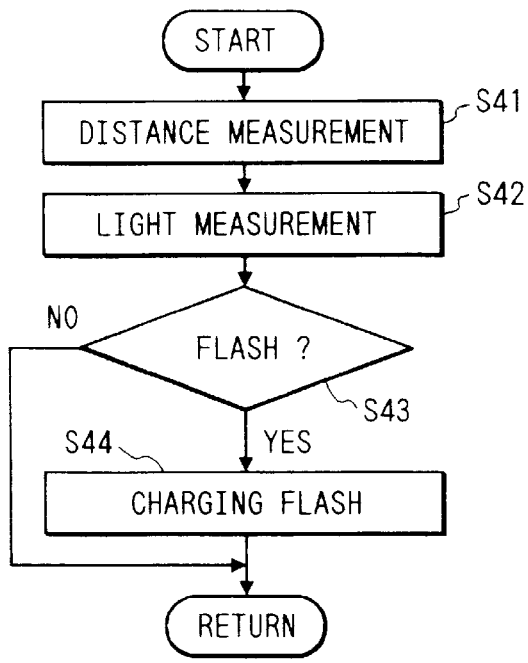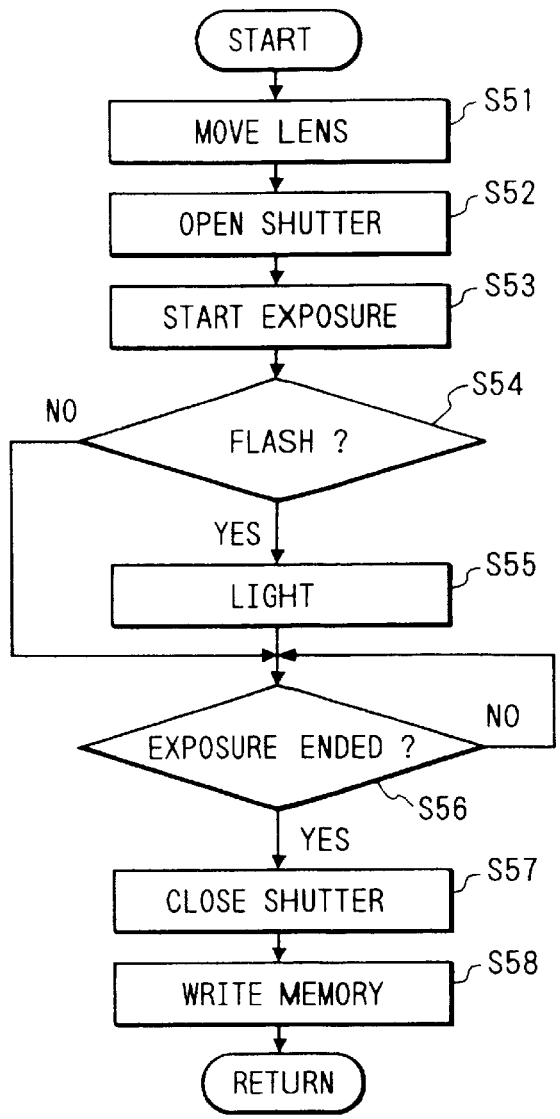

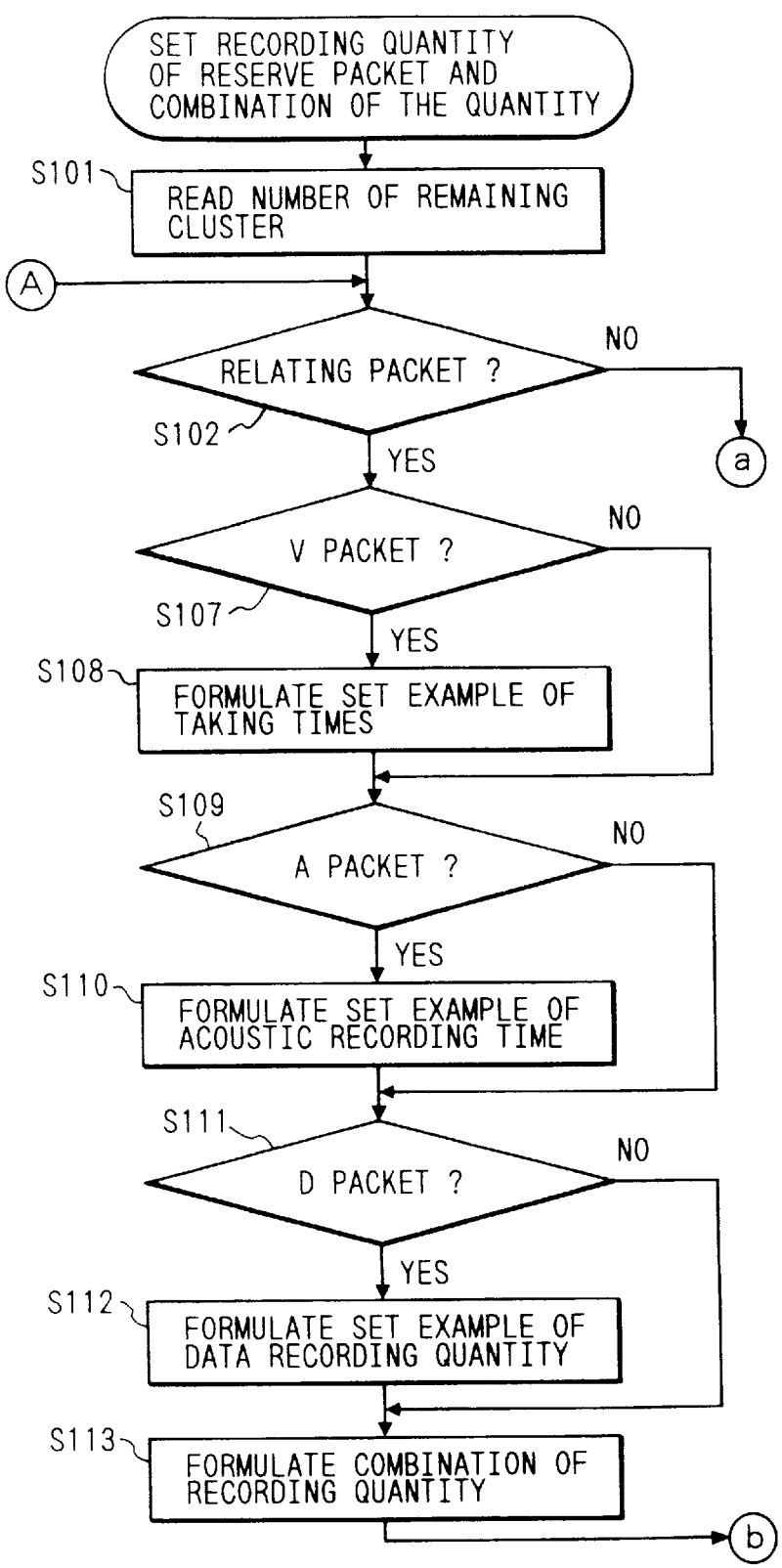

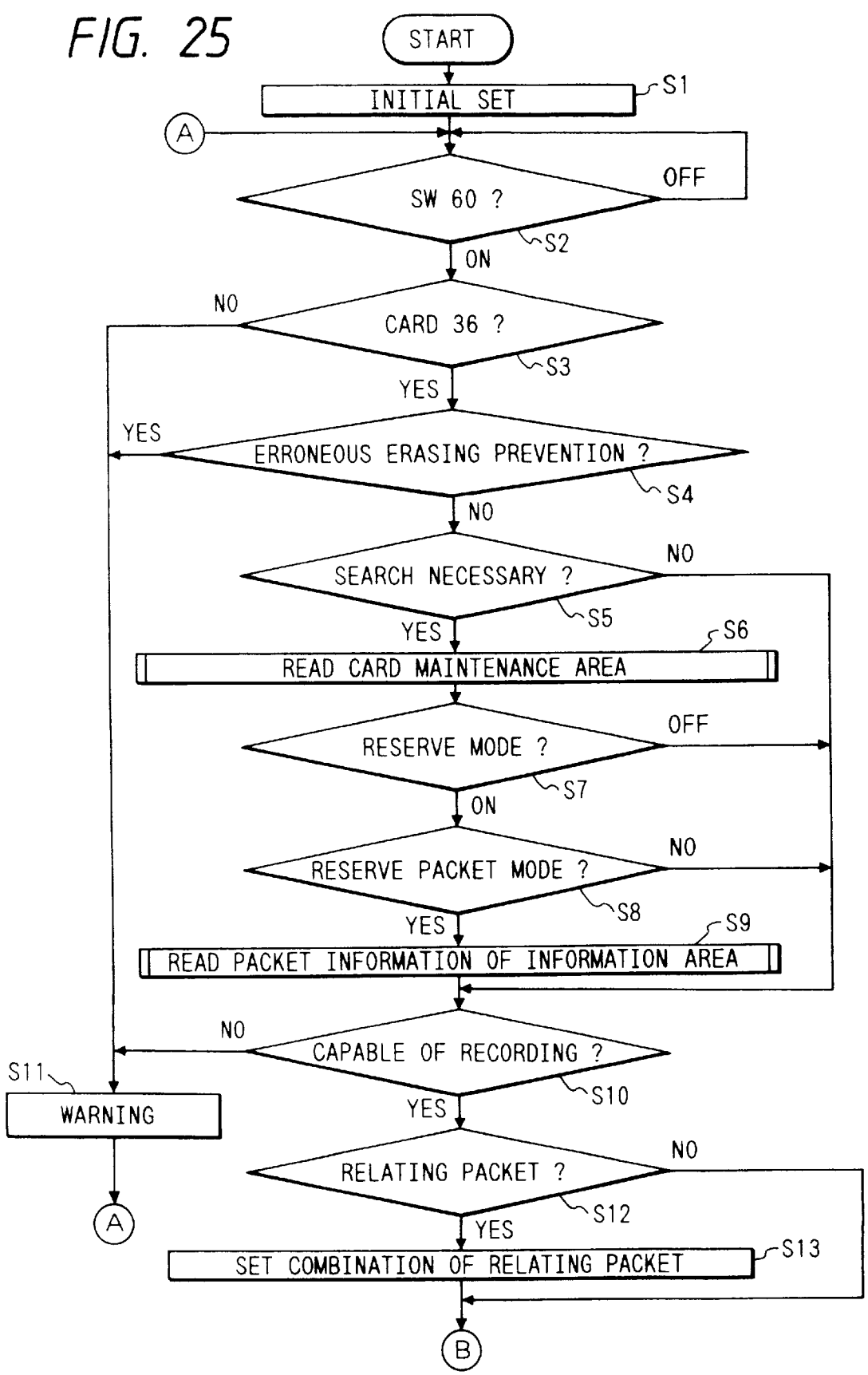

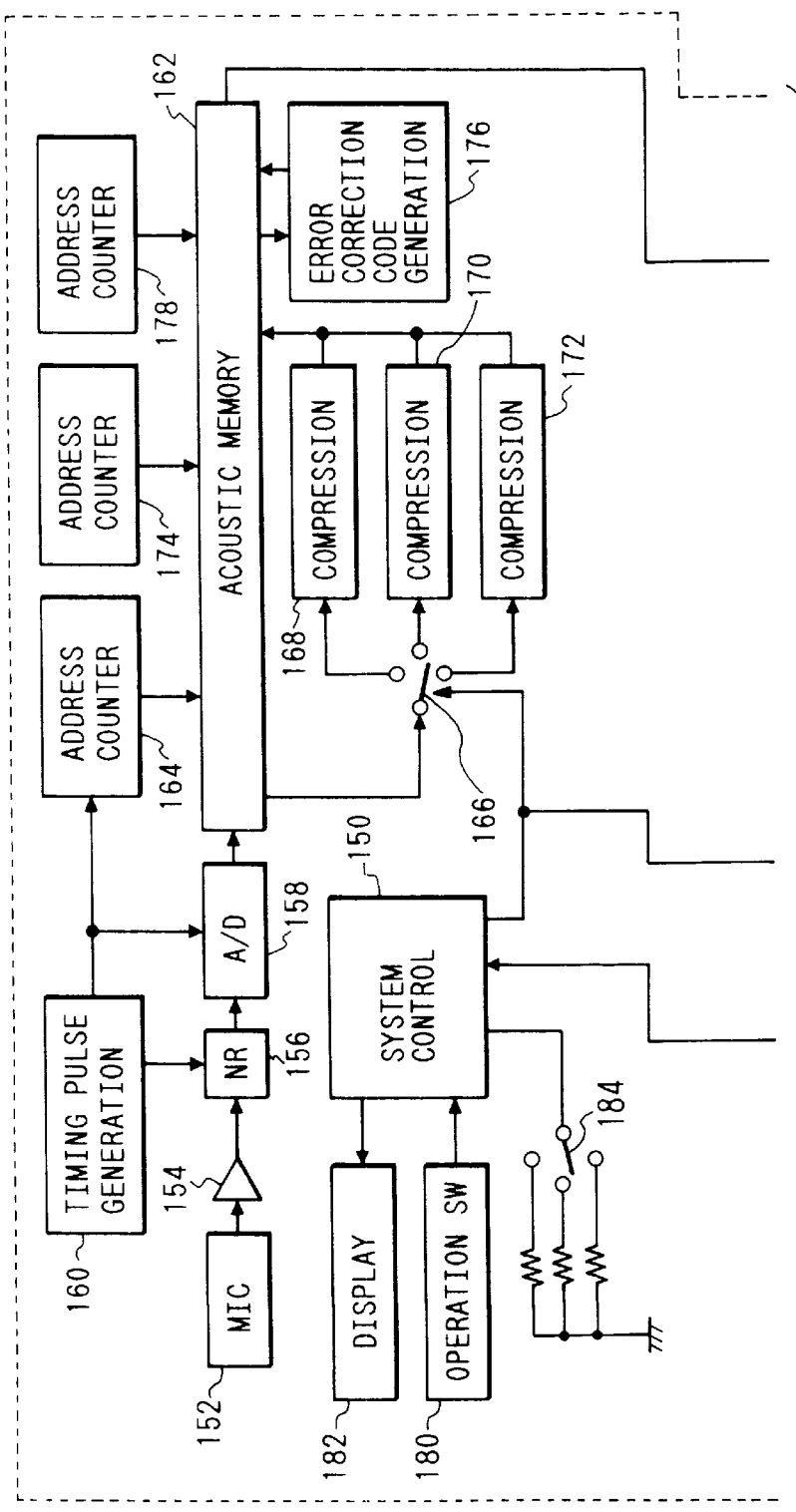

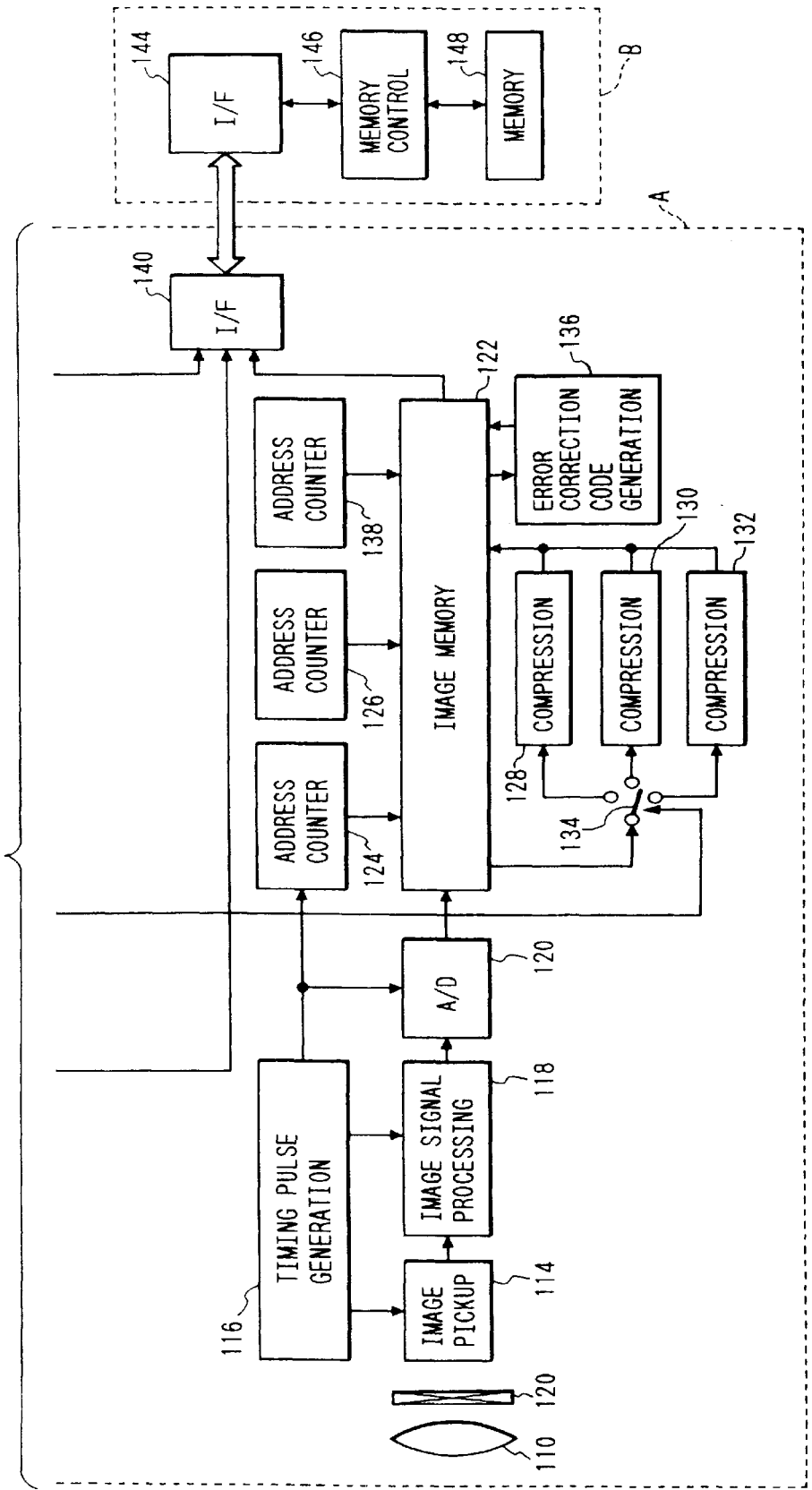

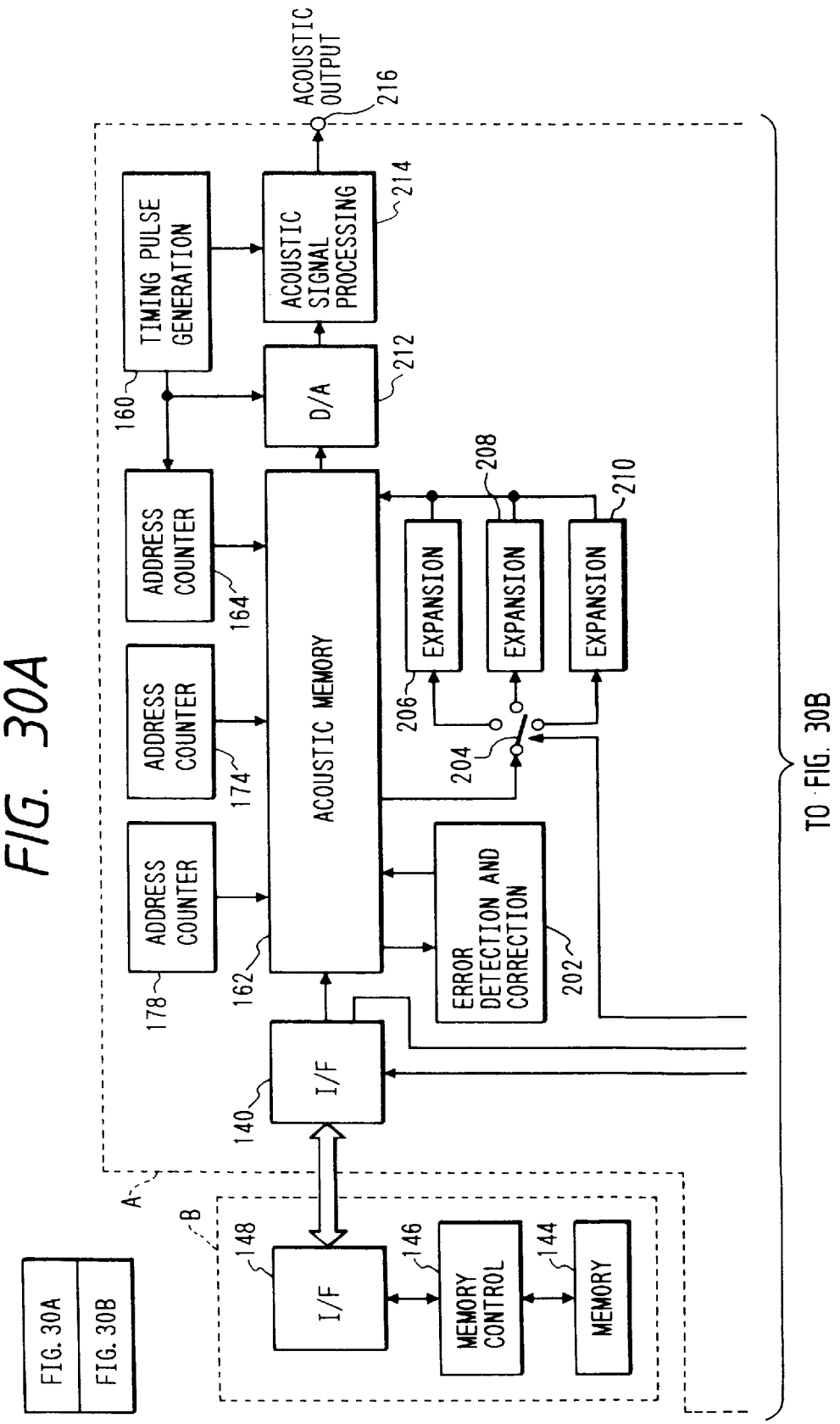

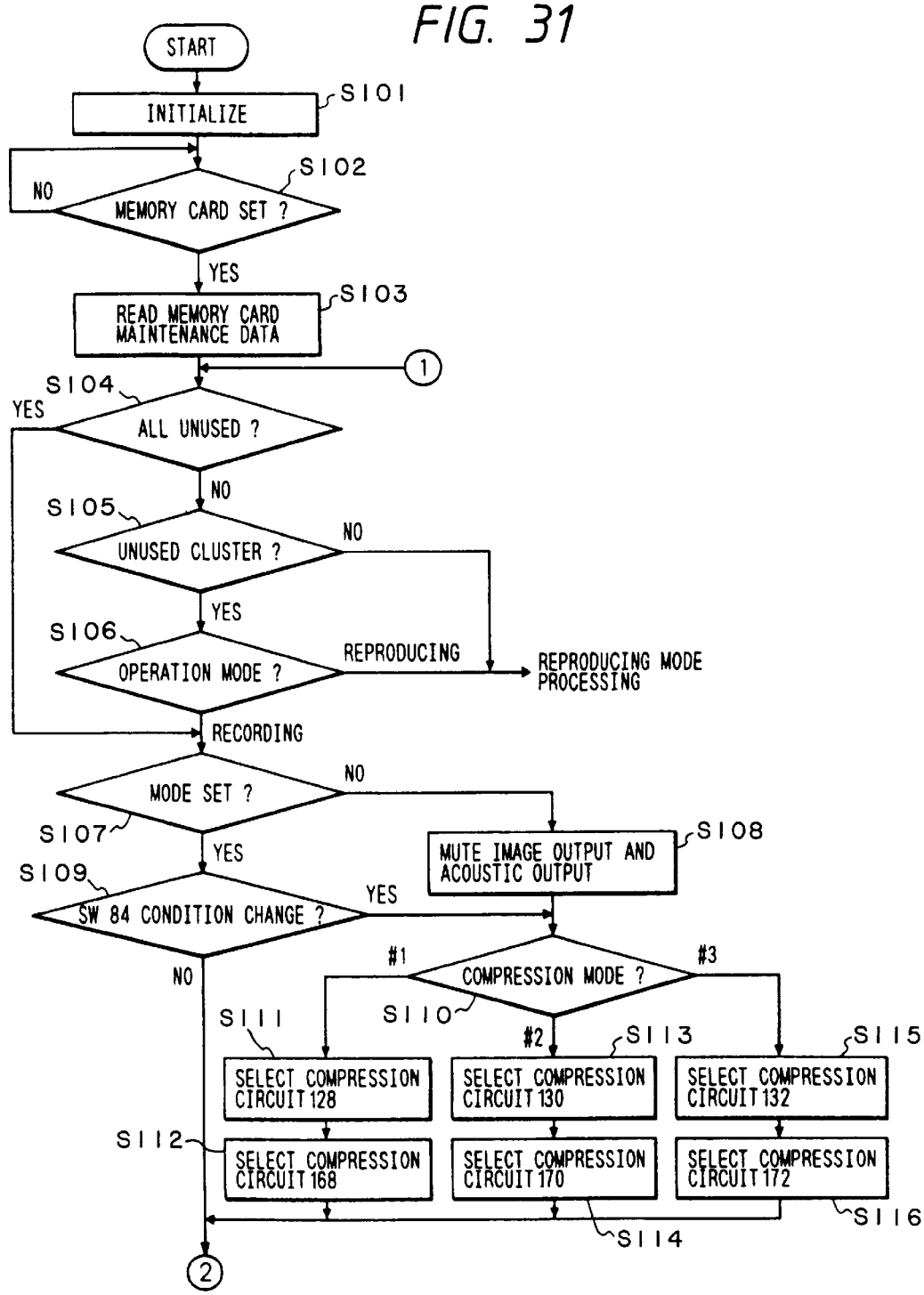

MULTIMODE AND AUDIO DATA COMPRESSION

This application is a continuation of application Ser. No. 08/294,605, filed Aug. 23, 1994, now abandoned, which was a continuation of application Ser. No. 07/850,491, filed Mar. 12, 1992, now abandoned.

BACKGROUND OF THE INVENTION

1. Field of the Invention

The present invention relates to a recording apparatus for recording the information such as a still picture or voice on a recording medium such as a semiconductor memory.

2. Related Background Art

Electronic still cameras for recording still pictures or voices on a magnetic disk known as a still video floppy as the recording medium have been available on the market. However, electronic still cameras using a memory card having a solid memory device such as DRAM, SRAM or EEPROM as the recording medium have been proposed.

In this type of camera, when the solid memory device is used as the recording medium, a method of managing the recording area is used in which the recording area is divided into a plurality of regions (clusters) each having a predetermined recording capacity. That is, the image, voice or data is recorded in a unit of cluster. For the image, a predetermined number of clusters are assigned, while for the voice, an arbitrary number of clusters corresponding to its length are assigned.

Thus, in a conventional example, an arbitrary number of clusters are assigned to record the voice, such that the number of unrecorded clusters is not equal to an integral multiple of the number of clusters necessary to record the image. Hence, for example, there may possibly occur an uneconomical situation such that the image can not be recorded because of the shortage of only one cluster. Also, there may occur a case such that a great number of clusters are used for the voice, so that the expected number of images can not be recorded.

With the electronic still cameras previously described, a method of managing the storage area of the memory card is used in, which the storage area is divided into a plurality of blocks (hereinafter referred to as clusters) each having a predetermined recording capacity, into which the image, voice and data can be recorded.

However, since, for example, when the image and the voice are recorded, associated with each other, the user can select the compression methods (modes) separately for the image and the voice, the user may have a feeling of disorder at the reproduction due to a difference between the compression ratios of the image and the voice.

SUMMARY OF THE INVENTION

It is an object of the present invention to provide a recording apparatus which can resolve the above-described problems totally or individually.

It is another object of the present invention to provide a recording apparatus for recording image signals on an expected number of sheets in a reliable manner.

It is a further object of the present invention to provide a recording apparatus having the improved operativity.

For these objects, according to a preferred example of the present invention, there is disclosed a recording apparatus for recording the still image and the voice onto a recording medium, in which each voice is recorded at a fixed recording capacity.

It is another object of the present invention to provide a recording apparatus for recording the voice in an expected recording time in a reliable manner.

Also, it is another object of the present invention to provide a multi-media recording apparatus for effectively recording a plurality of kinds of the information onto a recording medium.

It is a further object of the present invention to provide a recording apparatus having a new feature not seen conventionally.

Other objects and features of the present invention will be apparent from the following examples and the drawings.

BRIEF DESCRIPTION OF THE DRAWINGS

FIG. 2 shows a flowchart of the main routine, in part, in this example;

FIG. 4 shows a flowchart of a distance measurement and light measurement routine in this example;

FIG. 5 shows a flowchart of the image recording in this example;

FIG. 25 shows a flowchart of the main routine, in part, in the fifth example;

FIG. 29 shows a constitutional block diagram of a recording system in the sixth example of the present invention;

FIGS. 31–33 show flowcharts of a system control circuit 150, in part, at the recording.

DETAILED DESCRIPTION OF THE PREFERRED EMBODIMENTS

Figure 1B:
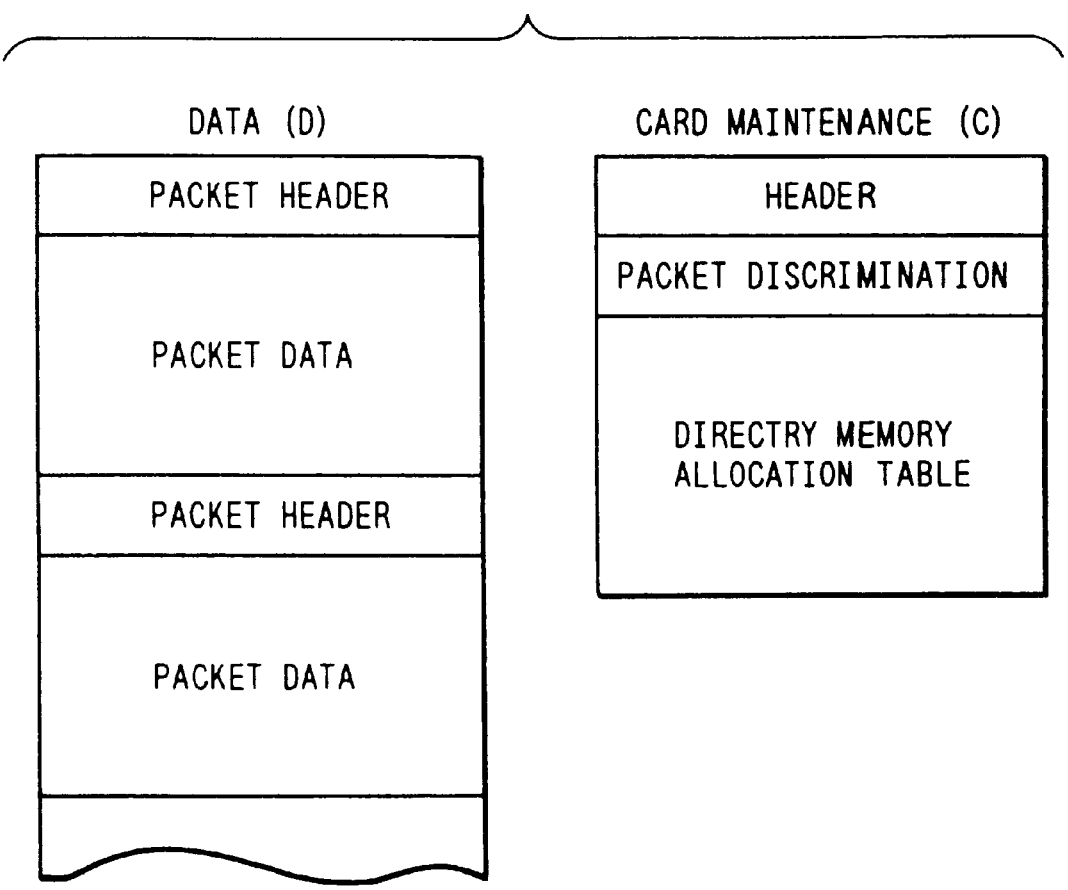
FIG. 1, consisting of FIGS. 1A and 1B, shows a constitutional block diagram in one example of the present invention.

The examples of the present invention will be described below with reference to the drawings.

In FIG. 1, 10 is a taking lens, 12 is a shutter having a stop feature, 14 is an image pick up device for converting an optical image into an electric signal, 16 is a process circuit for performing well-known camera signal processing such as gamma correction, 18 is an A/D converter for converting an analog output into a digital signal, and 20 is an image compression circuit for making the data compression with, for example, an adaptive discrete cosine transformation (ADCT). Also, 22 is a microphone for the input of voice, 24 is a noise reduction circuit for reducing the noise of voice signal from the microphone 22, 26 is an A/D converter for converting an output of the noise reduction circuit 24 into a digital signal, and 28 is a voice compression circuit for compressing the data with an adaptive differential PCM (ADPCM).

30 is a memory control circuit for controlling the A/D converters 18, 26, and the compression circuits 20, 28, the compression data obtained by the compression circuit 20, 28 being written into a buffer memory 32 under the control of the memory control circuit 30. 34 is an interface with a memory card 36, which comprises a memory circuit 38 for storing the data and its management information, and a memory control circuit 40 for controlling the writing and reading of the memory circuit 38, and a backup battery if required. The buffer memory 32 can be dispensed with when the memory device for use in the memory circuit 38 is a high speed device, but it is necessary for a low speed device such as an EEPROM. The memory may be any one of dynamic memory, such as semiconductor memory, or hard disk, or static memory.

42 is a lens drive circuit for driving a focusing lens of the taking lens 10, 44 is a shutter drive circuit for driving the shutter 12, 46 is a distance measurement circuit for measuring the distance to an object, 48 is a light measurement circuit for measuring the luminous intensity of the object, and 50 is a flash. 52 is a system control circuit for controlling the whole system, 54 is a display for displaying the operation conditions, such as a liquid crystal display, and 56 is a memory for storing the constants or variables for the operation of the system control circuit 52.

58 is a group of switches for inputting various operation commands for the system control circuit 52. The group of switches 58 includes, for example, a main switch 60, a distance measurement and light measurement switch 62, which is closed during the operation of a release button, not shown, to instruct the distance measurement circuit 46 and the light measurement circuit 48 to make the distance measurement and the light measurement, a release switch 64 which is closed upon the completion of the operation of the release button, not shown, to instruct the recording of a picked up image into the memory card 36, a mode switch 66 for selecting between a single (S) mode in which one sheet or pair of picture(s) is taken, a continuous (C) mode in which a plurality of sheets or pairs of pictures are taken continuously and a self-timer photographing mode, an image mode switch 68 for selecting the image recording method, such as the number of sheets for recording the image, the distinction of the frame recording/field recording, aspect ratio, pixel configuration, compression method, and the compression ratio, a voice on/off switch 70 for designating the on/off of the voice recording, and a voice mode switch 72 for selecting the voice recording method such as the recording time, recording band, and the number of recording channels in stereo or two languages.

The system control circuit 52 controls the taking lens 10 to be brought into the focusing state by causing the lens driving circuit 42 to drive the focusing lens of the taking lens 10 with, in accordance with a measurement result of the distance measurement circuit 46. The system control circuit 52 also determines the time of opening the shutter 12 with the shutter driving circuit 44 so as to have an optimal exposure quantity, in accordance with a measurement result of the distance measurement circuit 48.

The recording area of the memory circuit 38 in the memory card 36 is segmented into a card maintenance area and a data area, as shown in FIG. 1B at C and D, the data area being divided in a unit of cluster. The recording information such as image, voice or data is handled in a unit called a packet. The card maintenance area is comprised of a header, a packet discrimination, a directory and a memory allocation table. The header includes a format number, a card number, the number of remaining clusters, the number of used clusters, the final packet number, the start unused cluster number, and a card label. The packet discrimination is comprised of the type and category of each packet recorded, and the relating information of the packet. The directory is comprised of the number of a start cluster for each packet. The memory allocation table contains the cluster number to be connected to each cluster.

The data area is handled logically in a unit of a packet. The packet is comprised of a packet header and a packet data of arbitrary length. The packet header is comprised of the packet information, the date and a title. The packet information includes the coding method, the compression mode and the recording mode for the image or voice. For the image, it further includes the number of horizontal and vertical pixels and the aspect ratio of pixel. The packet is recorded in the memory 38, physically distributed into a plurality of clusters.

Figure 3:
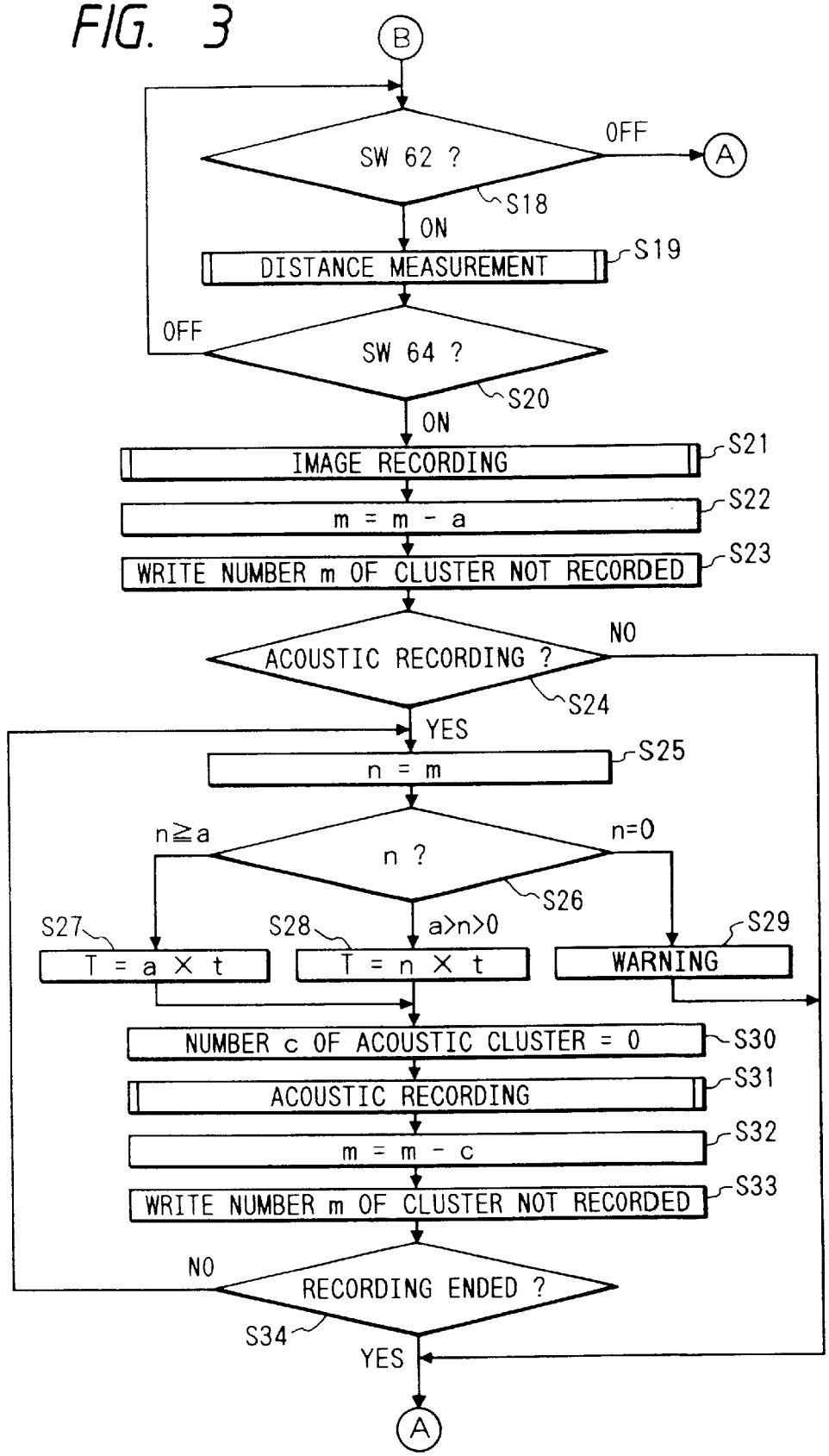
FIG. 3 shows a flowchart of the main routine, in part, in this example.

Referring now to FIGS. 2 to 6, the operation of this example will be described below. FIGS. 2 and 3 show the flowchart of the main routine in this example.

Upon turning on the power, the system control circuit 52 initializes the flags and control variables (S1), and if the main switch 60 is closed (S2), a check for the setting of the memory card 36 is made (S3). If the memory card 36 is not set, a warning is displayed with the display unit 54, and the system waits for the main switch 60 to be operated (S8). Also, if the setting for the erroneous deleting prevention has been made on the set memory card 36 (S4), a warning is displayed and the system waits for the main switch 60 to be operated (S8).

If the setting for the erroneous deleting prevention has not been made (S4), the number of unrecorded clusters to be recorded into the card maintenance area of the memory circuit 38 is read via the interface 34 and the memory control circuit 40 (S5). The system control circuit 52 determines the number of clusters necessary to record one sheet of image in accordance with an image compression mode to be recorded in the ROM area of the memory circuit 38 or set by the image mode switch 68 (S6). A check is made to determine whether or not the image can be recorded into the unrecorded cluster (m≧a) (S7), in which if it can not be recorded (m<a), a warning is displayed, and the processing returns to step S2 (S8), while if it can be recorded (m≧a), the voice on/off switch 70 is examined (S9) to start the voice recording if the switch 70 is on.

First, the voice-recording time t recordable in one cluster is calculated in accordance with the voice compression mode to be recorded in the ROM area of the memory circuit 38 or set by the voice mode switch 72 (S10). The number of clusters n (=m−a) remaining after one sheet of image is recorded on m unrecorded clusters is calculated (S11). If n=0 (S12), a warning of the impossible recording is displayed (S16), and the voice recording mode set by the switch 70 is released (S17). If n≧a (S12), the recording time (=t×a) corresponding to the number of clusters necessary to record one sheet of image is calculated (S13), while if a>n>0, the recording time T (=n×t) taken when the voice is recorded on all the remaining clusters is calculated (S14), and the time T calculated at S13 and S14 is displayed as the recording timer on the display 54 (S15).

After S15 and S17, if the distance measurement and light measurement switch 60 is off, the processing returns to S2 (S18), while if it is on, the distance measurement and the light measurement are made with the distance measurement circuit 46 and the light measurement circuit 48 to adjust the focus of the taking lens 10 on an object, and determine the shutter time (S19). The details of the distance measurement and the light measurement will be described later. The distance measurement and the light measurement are repeated (S19) until the distance measurement and light measurement switch 60 is on and the release switch 64 is turned on (S20).

If the release switch 64 is turned on, the photographing (image recording) is performed (S21). The details of the image recording will be described later. After one sheet of image is recorded, the number of unrecorded clusters m is updated (S22), and then written into the card maintenance area of the memory circuit 38 (S23).

If the voice is recorded (S24), the number of unrecorded clusters m is substituted for n (S25). If n=0 (S26), a warning is displayed because there is no recordable cluster, and the processing returns to S2 (S29), if n≧a (S26), the recording time T (=t×a) corresponding to the number of clusters necessary to record one sheet of image is calculated (S27), and if a>n>0 (S26), the recording time T (=n×t) taken when the voice is recorded on all the remaining clusters is calculated (S28).

After S27 and S28, the variable C indicating the number of recorded clusters is initialized (S30), and the voice recording is performed (S31). The details of the voice recording will be described later. After the voice recording (S31), the number of acoustic recorded clusters C is subtracted from the number of unrecorded clusters m (S32), and the number of unrecorded clusters m is written into the card maintenance area of the memory circuit 38 (S33). The steps following S25 are repeated until the recording is completed (S34), and the processing returns to S2 after the recording is completed.

FIG. 4 shows a detailed flowchart of the distance measurement and light measurement operation at S19 in FIG. 3. The distance to the object is measured with the distance measurement circuit 46 to store measurement data in the memory 56 (S41), and the brightness of the object is measured with the light measurement circuit 48 to store measurement data in the memory 56 (S42). A determination is made whether or not the flash is necessary, based on a light measurement value of the light measurement circuit 48 (S43), and if it is necessary, a flash flag is set to charge the flash 50 (S44).

FIG. 5 shows a detailed flowchart of the image recording at S21 in FIG. 3. The system control circuit 52 reads the distance data to the object which is stored in the memory 56, and drives a focusing lens of the taking lens 10 with the lens drive circuit 42 to adjust the focus on the object (S51). Also, the shutter 12 is opened with the shutter drive circuit 44 in accordance with the light measurement data stored in the memory 56 to expose the image pick up device 14 (S52) A check is made to determine whether or not the flash is necessary, based on the flash flag (S54), and if it is necessary, the flash 50 is lighted (S55). The system waits for the image pick up device 14 to terminate the exposure (S56), after which the shutter 12 is closed (S57) to read the electric charge signal from the image pick up device 14, and the picked up image is written via a process circuit 16, the A/D converter 18, the image compression circuit 20, the buffer memory 32 and the interface 24 into the memory circuit 38 of the memory card 36 (S58).

Figure 6:
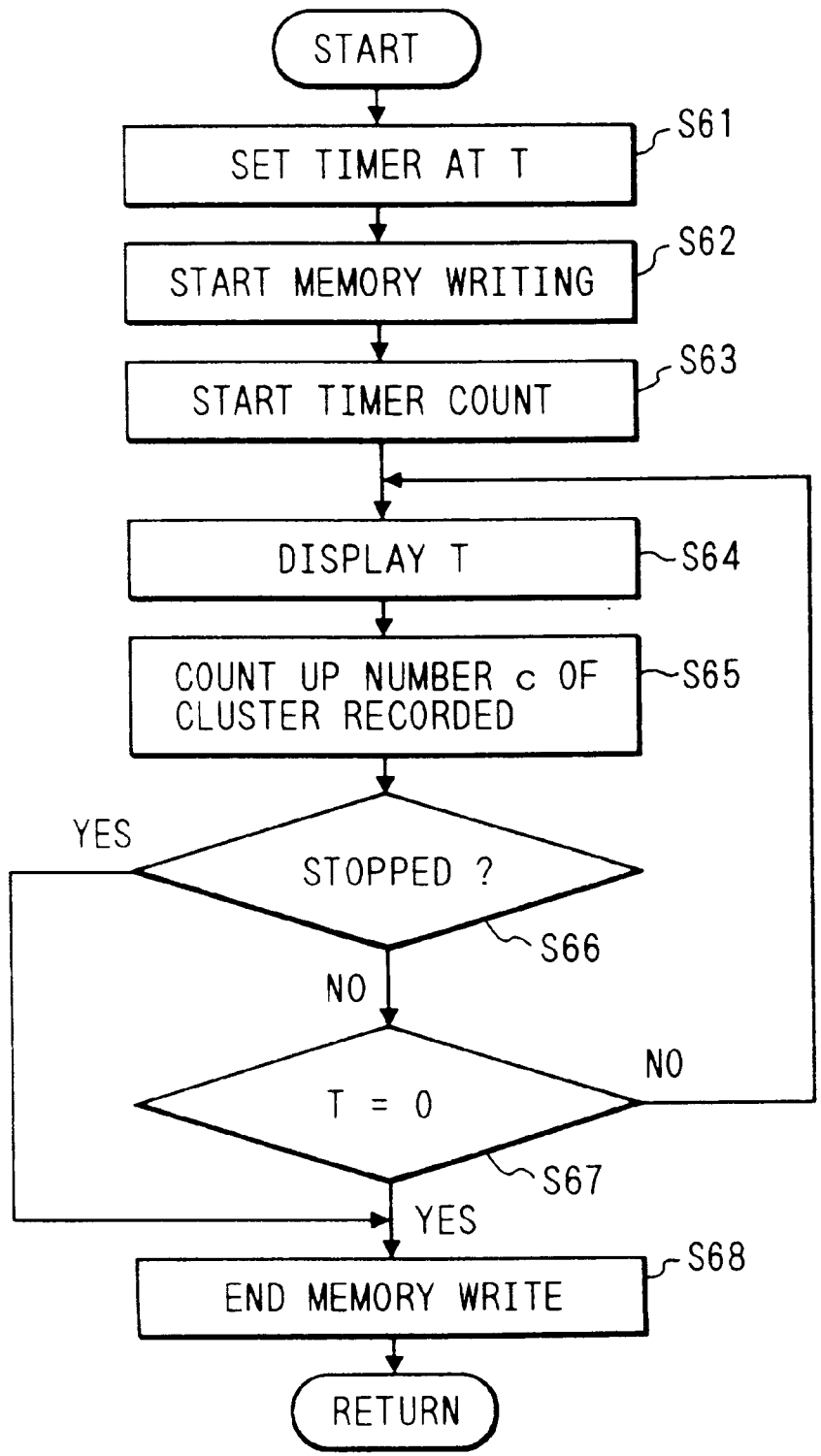
FIG. 6 shows a flowchart of the voice recording in this example.

FIG. 6 shows a detailed flowchart of the voice recording at S31 in FIG. 3. The time T calculated at S27 and S28 is set to the recording timer (S61), and the compressed acoustic data is written into the memory circuit 38 and the timer count is started (S62, S63). The time T is displayed on the display unit 54 (S64), and the number of recorded clusters C is counted up (S65). The acoustic recording is compulsorily stopped externally (S66), or the compressed voice data is continuously written into the memory circuit 38 until T becomes zero (S67), while T is displayed (S64) and the number of recorded clusters C is counted up. If the acoustic recording is stopped (S66) or T=0 is reached (S67), the writing into the memory circuit 38 is completed (S68). At the time when the writing into the memory circuit 38 is completed, C indicates the number of recorded clusters.

In the above example, a semiconductor memory is used as the recording medium, but the present invention is not limited by the kind of the recording medium.

As can be easily understood from the above description, with this example, the storage areas corresponding in number to the acoustic recordings can be assigned, taking into consideration the capacity necessary for the image recording, so that the storage area of the recording medium can be effectively used.

The second example of the present invention will be described below.

In this example, in addition to the operation switches as shown in FIG. 1, the group of switches 58 further include a cluster number setting switch 74 for setting the number of clusters for the acoustic recording, and a switch 76 for designating one of a plurality of the combinations of the voice compression modes and the recording times. The cluster number setting switch 74 allows the selection of a continuous acoustic recording (AC) mode in which the voice is continuously recorded until the recording is terminated for one sheet of image or recordable clusters are exhausted, and a single acoustic recording (AS) mode in which the voice is recorded into a predetermined number of clusters for one sheet of image, with two modes AS1 and AS2 different in the number of clusters being selectable. In this example, two kinds of the cluster number can be selected in the single acoustic recording mode, but it is noted that three or more kinds or arbitrary kinds of the cluster number may be selected. In this example, one of two kinds of combination (A1 mode and A2 mode) is selected with the switch 76, but it is also noted that three or more kinds of combination may be used. Of course, the recording time is longer with higher compression ratio, if the cluster number is the same, and therefore, the recording time is shorter with lower compression ratio.

Figure 7:
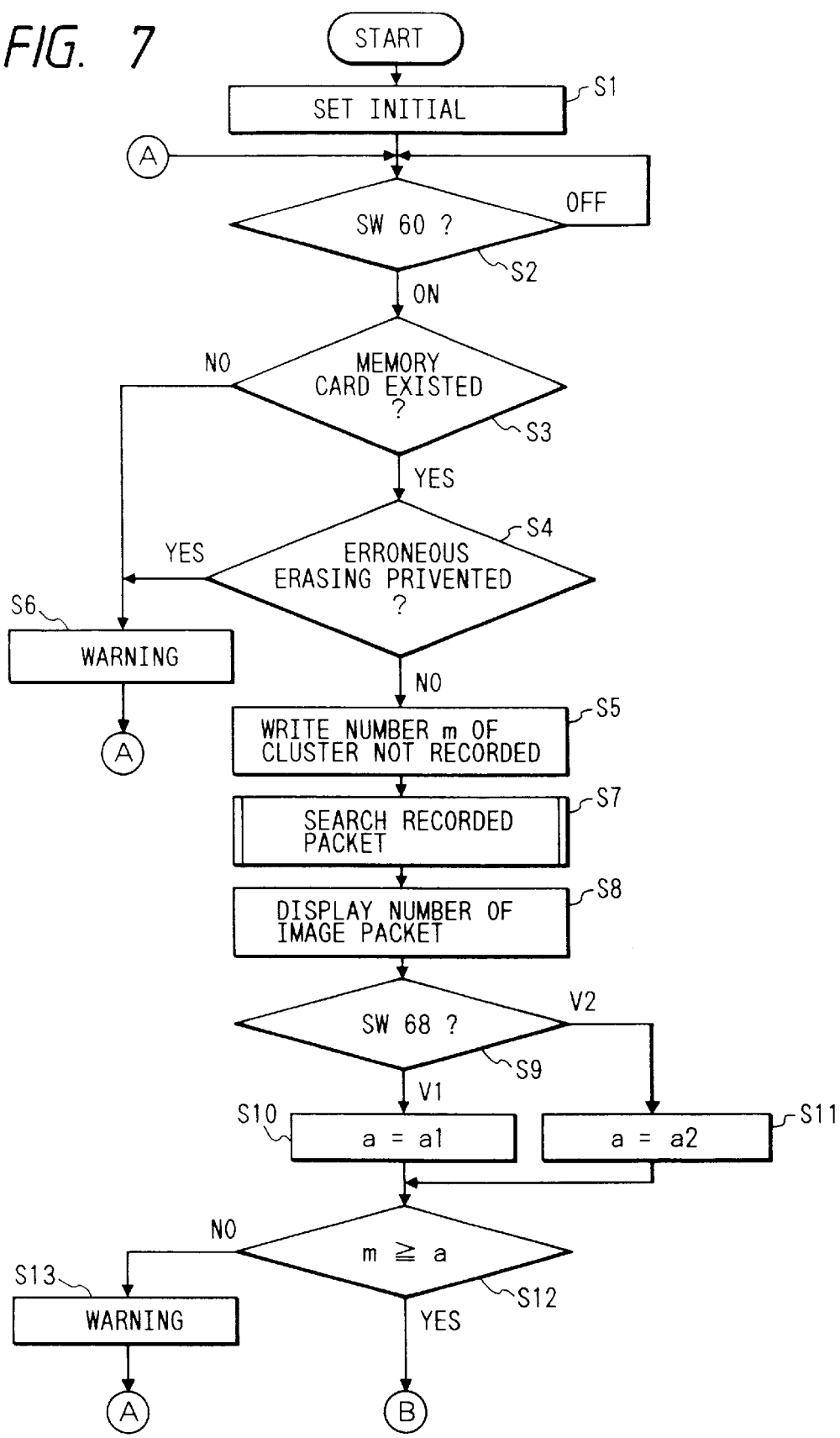
FIG. 7 shows a flowchart of the main routine, in part, in the second example.
Figure 8:
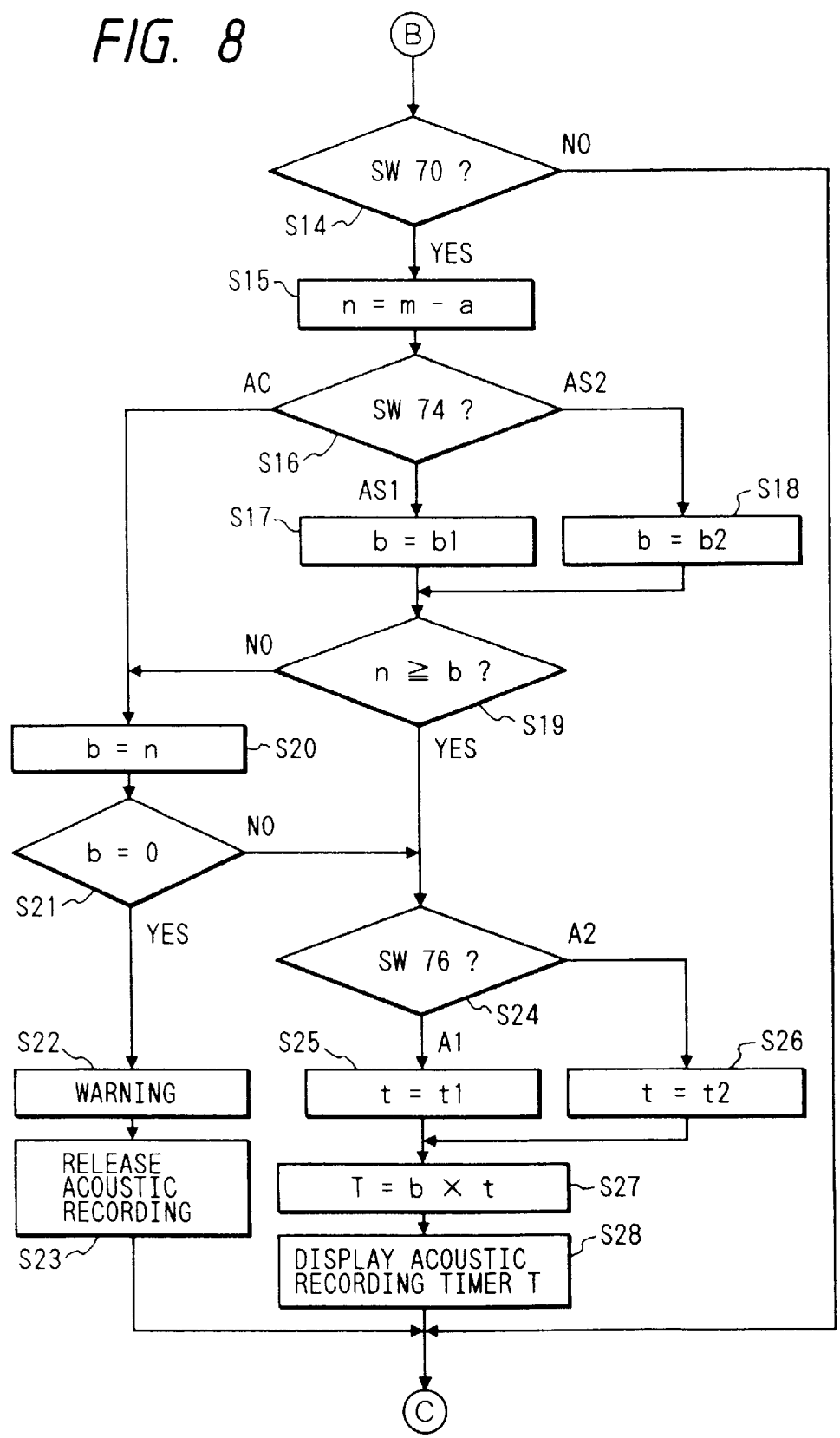
FIG. 8 shows a flowchart of the main routine, in part, in the second example.
Figure 9:
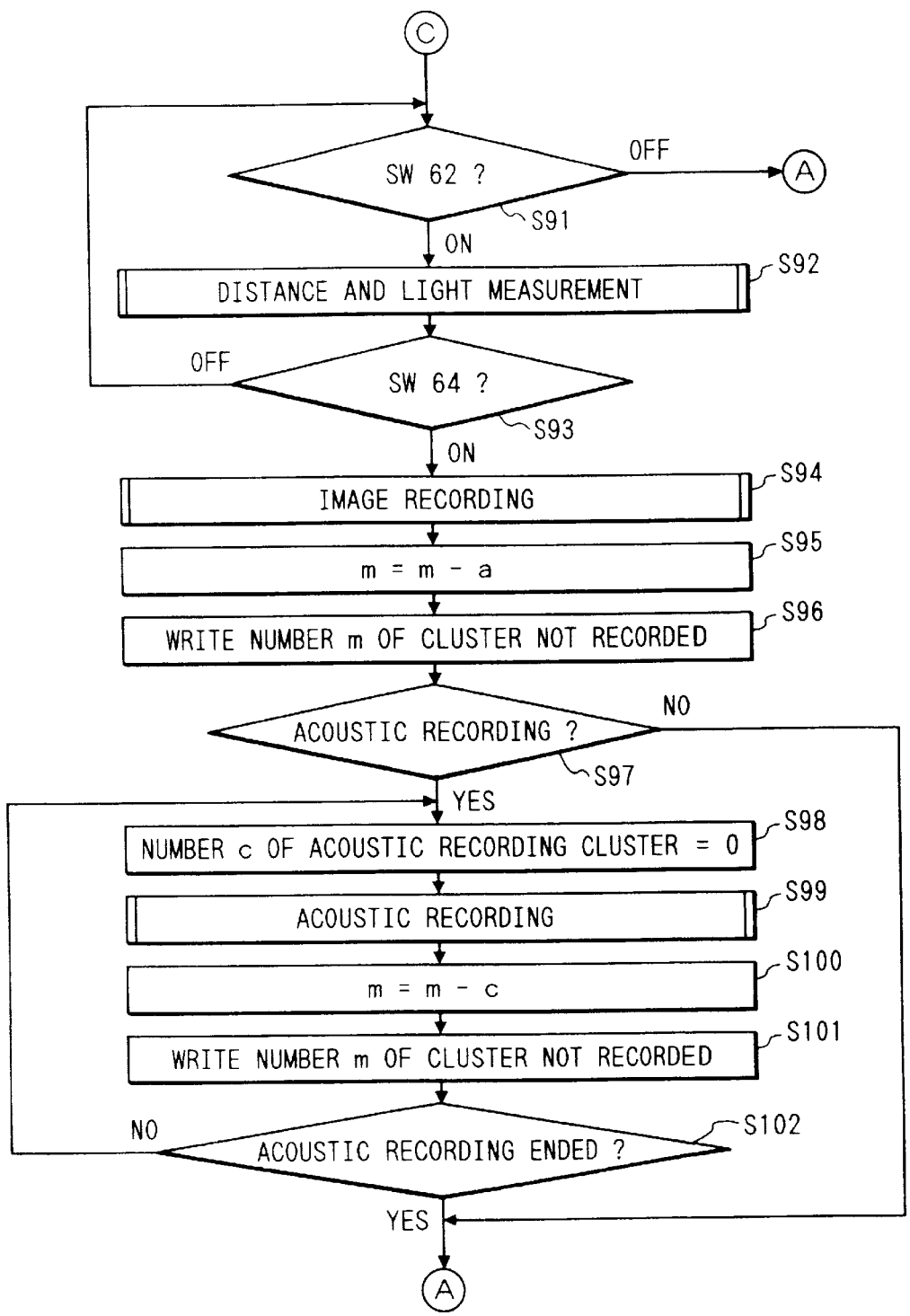
FIG. 9 shows a flowchart of the main routine, in part, in the second example.

Referring now to FIGS. 7 to 10, the operation of this example will be described below. FIGS. 7 to 9 show the flowchart of the main routine in this example as a whole.

Upon turning on the power, the system control circuit 52 initializes the flags and control variables (S1), and if the main switch 60 is closed (S2), a check for the setting of the memory card 36 is made (S3). If the memory card 36 is not set, a warning is displayed with the display unit 54, and the system waits for the main switch 60 to be operated (S8). Also, if the setting for the erroneous deleting prevention has been made on the set memory card 36 (S4), a warning is displayed and the system waits for the main switch 60 to be operated (S6).

If the setting for the erroneous deleting prevention has not been made (S4), the number of unrecorded clusters to be recorded into the card maintenance area of the memory circuit 38 is read via the interface 34 and the memory control circuit 40 (S5). The system control circuit 52 also search the packet type information in the packet discrimination information to be recorded into the card maintenance area to investigate the respective number of packets for the image, the voice and the data (S7). The number of packets for the image is displayed on the display unit 54 (S8), and the number of clusters necessary to record one sheet of image is determined in accordance with an image compression mode to be recorded in the ROM area of the memory circuit 38 or set by the image mode switch 68 (S9, S10, S11). In this example, either of two image compression modes V1, V2 can be selected, in which a1 is substituted for a in the V1 mode (S10), while a2 is substituted for a in the V2 mode (S11).

A check is made to determine whether or not the image can be recorded into the unrecorded cluster ($m \geq a$) (S12), in which if it can not be recorded (m<a), a warning is displayed, and the processing returns to step S2 (S13), while if it can be recorded ($m \geq a$), the voice on/off switch 70 is examined (S14) to go to S91 if it is off.

If the switch 70 is on (S14), the number of clusters n remaining after one sheet of image is recorded into the unrecorded cluster (=m−a) is calculated (S17). The number of required clusters b is determined in accordance with the a voice compression mode stored in the ROM area of the memory circuit 38 or set by the switch 74 (S17, S18, S20). In the single acoustic recording mode AS1 or AS2, the comparison is made between the number of unrecorded clusters n (the number of unrecorded clusters when it is assumed that one sheet of image is recorded) and b (S19), in which if the number of unrecorded clusters is insufficient (n<b), n is substituted for the number of recorded clusters b (S20). In the continuous acoustic recording (AC) mode (S16), n is substituted for the number of recorded clusters b (S20). After S20, if b is equal to 0, a warning is displayed (S22) as it is meant that there is no recordable cluster, and then the acoustic recording mode is released (S23).

If the recording is possible because of $n \geq b$ (S19), the recording time t for one cluster is determined in accordance with the voice compression mode recorded in the ROM area of the memory circuit 38, and a combination of the voice compression mode set by the switch 76 and the recording time (S24, S25, S26). The number of recorded clusters b and t are multiplied to determine the recording time T (S27), and T is displayed as the recording timer on the display unit 54 (S28).

After S23 and S28, if the distance measurement and light measurement switch 60 is off, the processing returns to S2 (S91), while if it is on, the distance measurement and the light measurement are made with the distance measurement circuit 46 and the light measurement circuit 48 to adjust the focus of the taking lens 10 on an object, and determine the shutter time (S92). The details of the distance measurement and the light measurement are the same as previously described. The distance measurement and the light measurement are repeated (S92) until the distance measurement and light measurement switch 60 is on and the release switch 64 is turned on (S93).

If the release switch 64 is turned on, the photographing (image recording) is performed (S94). The details of the image recording will be described later. After one sheet of image is recorded, the number of unrecorded clusters m is updated (S95), and then written into the card maintenance area of the memory circuit 38 (S96).

If the acoustic recording is performed (S97), the variable C indicating the number of recorded clusters m is initialized (S98), and the acoustic recording is executed (S99). The details of the acoustic recording will be described later. After the acoustic recording (S99), the number of acoustic recorded clusters C is subtracted from the number of unrecorded clusters m (S100), and the number of unrecorded clusters m is written into the card maintenance area of the memory circuit 38 (S101). The steps following S98 are repeated until the recording is completed (S102), and the processing returns to S2 after the recording is completed.

Figure 10:
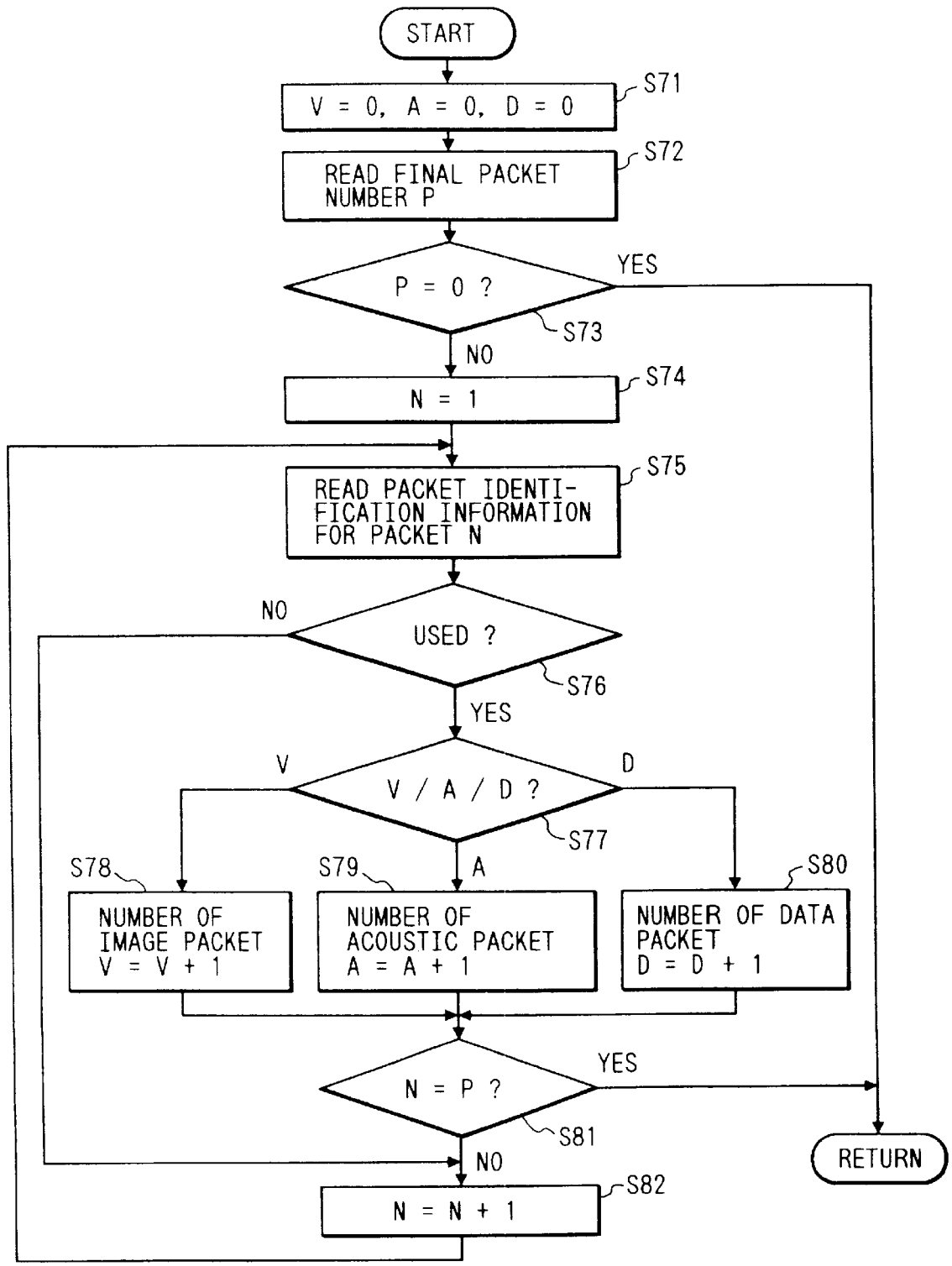
FIG. 10 shows a flowchart of a recorded packet search routine in this example.

FIG. 10 shows a flowchart of a recorded packet search routine at S7 in FIG. 7. SC52 first initializes the variable V, A and D for the number of packets for the image, the voice and the data (S71), and the final packet number P recorded in the card maintenance area of the memory circuit 38 is read via the interface 34 and the memory control circuit 40 (S72). If P=0, the search sequence is terminated. If it is not zero, a loop variable N is initialized (S74), the packet identification information for packet N is read (S75). If the packet has not been used, the next packet is examined (S82), while if it has been used (S76), V, A or D is incremented (S78, S79, S80) depending on which of image, voice and data is recorded (S77). Each packet is investigated while N is incremented (S82) up to the final packet number P (S81).

When the data packet is used as the relating packet of the image packet, the number of clusters d for use in the data packet must be added to the number of clusters a for use in the image packet. Specifically, at S10 and S11 in FIG. 7, a=a1+d and a=a2+d are provided. And the information of the data packet must be written when the number of unrecorded clusters m is written together with other card maintenance data at S96 in the figure.

When the acoustic packet is used as the relating information of the image packet, the partner's packet number must be written into the packet relating information in the card maintenance data at one or both of S96 and S101 in FIG. 4.

When both the acoustic packet and the data packet are used as the relating information of the image packet, the number of the acoustic packet must be written into the packet relating information of the image packet, and the packet number of the data packet into the packet relating informations of the acoustic packet. When the data packet is mainly used, the number of the image packet must be written into the relating information of the data packet, and the packet number of the acoustic packet into the relating information of the image packet.

As can be easily understood from the above description, with this example, since the recording time is determined from the acoustic compression ratio, with a constant recording capacity for use in each acoustic recording, it is possible to use the recording area of the recording medium effectively. Also, it is possible to prevent insufficient recording capacity from occurring in taking a photograph, because the capacity for the image recording is reserved.

The third example of the present invention will be described below.

In this example, in addition to the switches of the second example, there is further provided a display mode switch 78.

The display mode switch 78 is one for indicating the switching of the display for the use conditions of the memory card 36.

Figure 11:
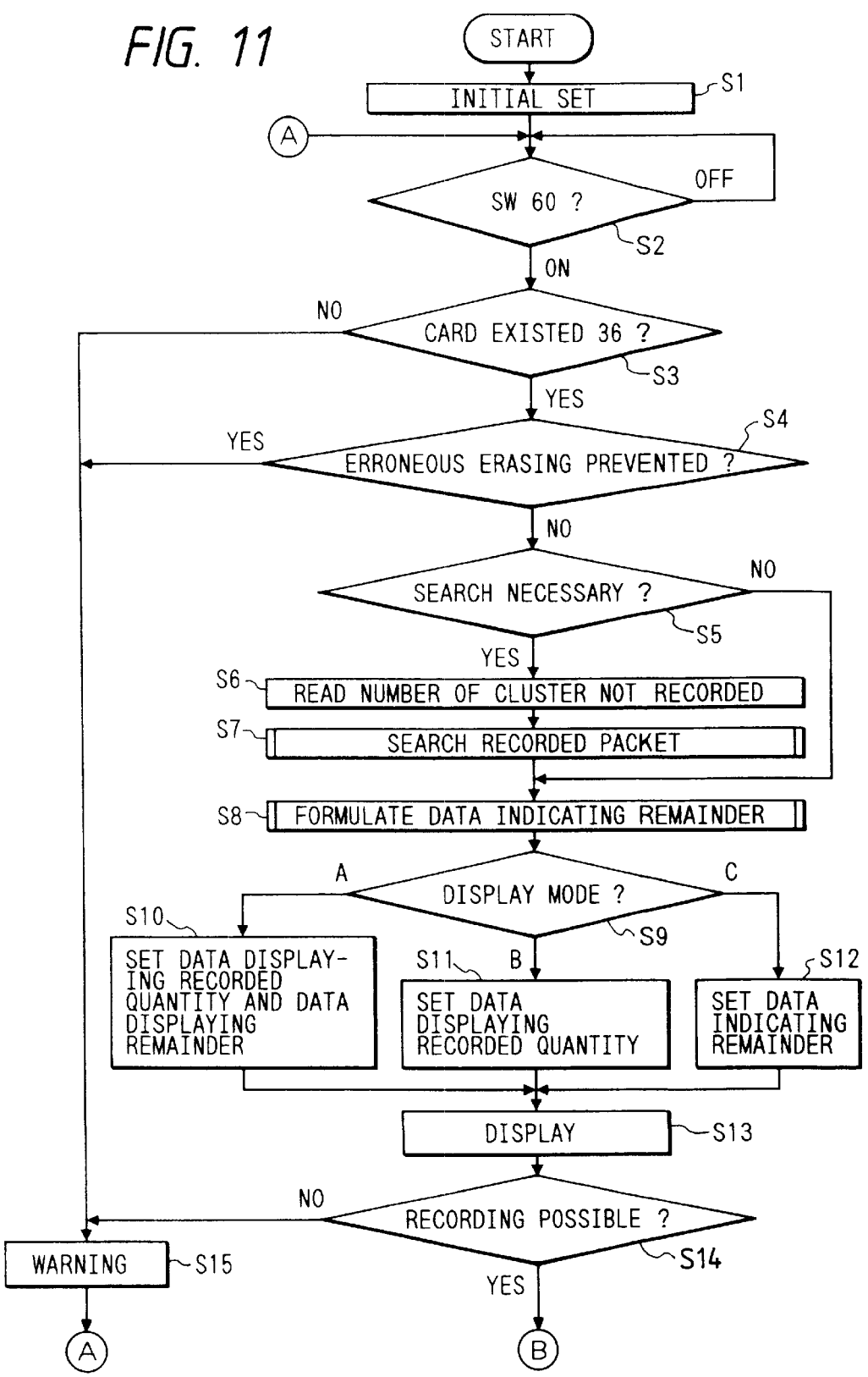
FIG. 11 shows a flowchart of the main routine, in part, in the third example.
Figure 12:
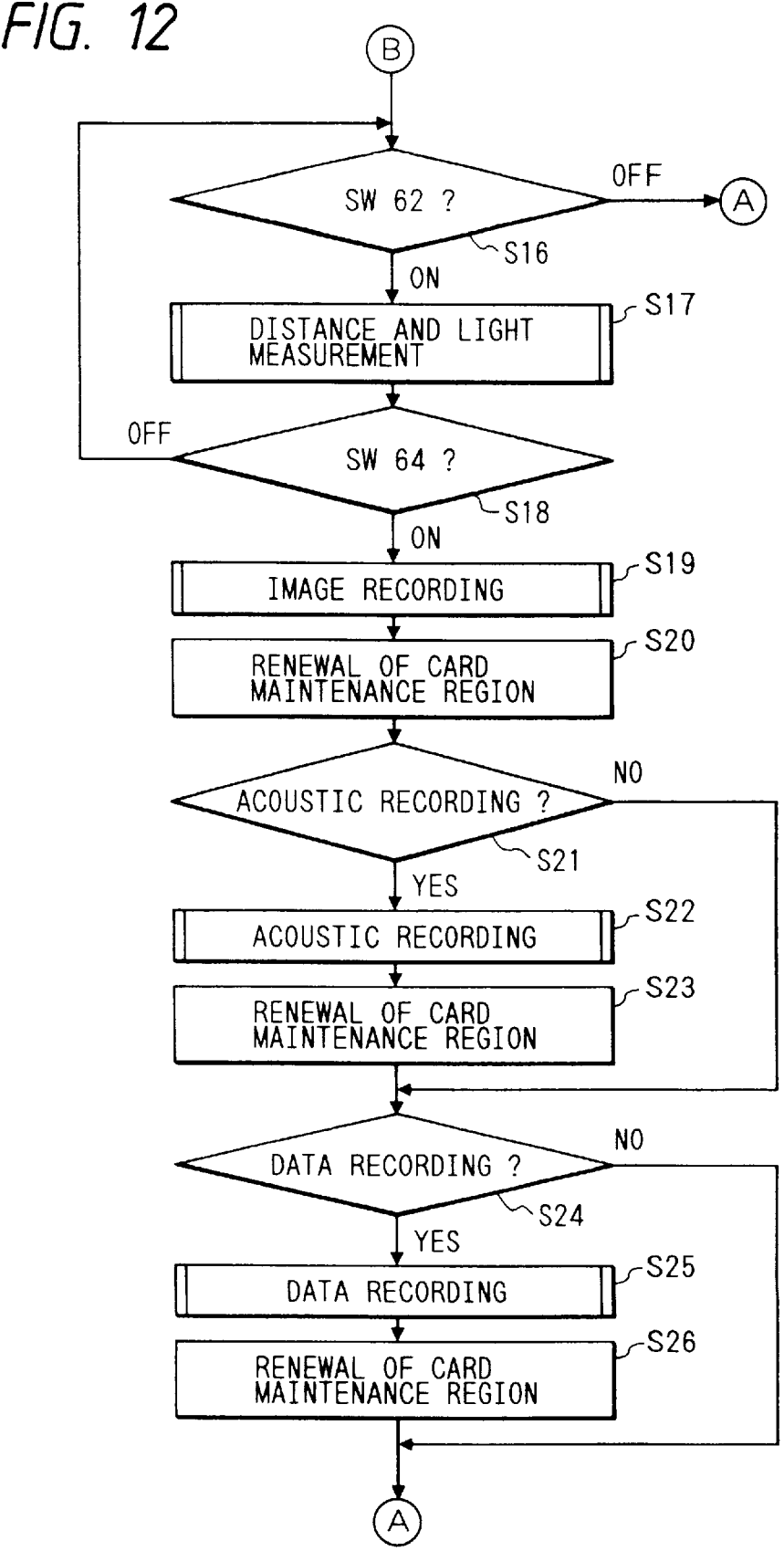
FIG. 12 shows a flowchart of the main routine, in part, in the third example.

Referring now to FIG. 11 and ensuing figures, the operation of this example will be described below. FIGS. 11 and 12 show the flowchart of the main routine in this example as a whole.

Upon turning on the power, the system control circuit 52 initializes the flags and control variables (S1), and if the main switch 60 is turned on (S2), a check for the setting of the memory card 36 is made (S3). Then a check is made to determine whether or not the setting for the erroneous erasing prevention has been made on the set memory card 36 (S4). If the memory card 36 is not set, and the erroneous erasing prevention is set, a warning is displayed on the display unit 54, and the processing returns to S2 (S15). If the erroneous erasing prevention is not set (S4), and it is necessary to read the recording content of the card maintenance area of the memory card 36 (S5), the data corresponding to the number of unrecorded clusters is read from the card maintenance area (S6), and the recorded packet is searched (S7). For example, when the card maintenance area has been already read, this search is unnecessary, so that S6 and S7 are bypassed.

When the search is unnecessary (S5), and after the recorded packet is searched (S7), the remainder indicating data is formulated based on the mode set by the group of switches 58 or set via the external interface (S8). The display mode is switched between A, B and C, in accordance with the display mode switch 78 (S9), and the data corresponding to a selected display mode is set in the memory 56 (S10, S11, S12).

The display mode A is one in which the display contents of display mode B and display mode C as will be described later are displayed together. The display mode B is one in which the recorded amount of the memory card 36 is displayed, including the number of photographed image sheets, the acoustic recorded time, the number of recorded divisions when the voice of a certain length is one division, the recorded amount of data, and the recorded amount of the image, the voice and the data in combination and the combinational relation thereof. The display mode C is one in which the remainder is displayed, including the allowable number of photographs for the image, the recordable time for the voice, the number of recordable divisions when the voice of a certain length is one division, the recordable amount of data, and the recordable amount of the image, the voice and the data in combination and the combinational relation thereof.

In the display mode A, the display data for the recorded amount and the remainder are set in the memory 56 (S10); in the display mode B, the display data for the recorded amount is set in the memory 56 (S11); and in the display mode C, the display data for the remainder is set in the memory 56 (S12). The data set in the memory 56 is displayed on the display unit 54 (S13).

The system control circuit 52 determines whether the recording is possible or not, based on the information of the number of unrecorded clusters obtained at S6 and the state of the recording mode set by the group of switches 58 (S14), and if it is not possible, a warning is displayed on the display unit 54, and the processing returns to S2 (S15).

The system control circuit 52 repeats S2 to S15 while the distance measurement and light measurement switch 62 is off (S16), and upon the switch 62 being turned on, the distance measurement and the light measurement are performed (S17). They are continued until the release switch 64 is turned on, and while the distance measurement and light measurement switch 62 is on (S16, S17). When the release switch 62 is turned on (S18), the photographing (image recording) is made (S19), and the card maintenance area of the memory circuit 38 is updated (S20).

If the acoustic recording is performed in accordance with a combination of the relating packets set in the memory 56 (S21), the acoustic recording and the renewal of the card maintenance area are carried out (S22, S23), while if the data recording is performed (S24), the data recording and the renewal of the card maintenance area are carried out (S25, S26).

Thereafter, the processing returns to S2, and S2 to S26 are repeated.

Figure 13:
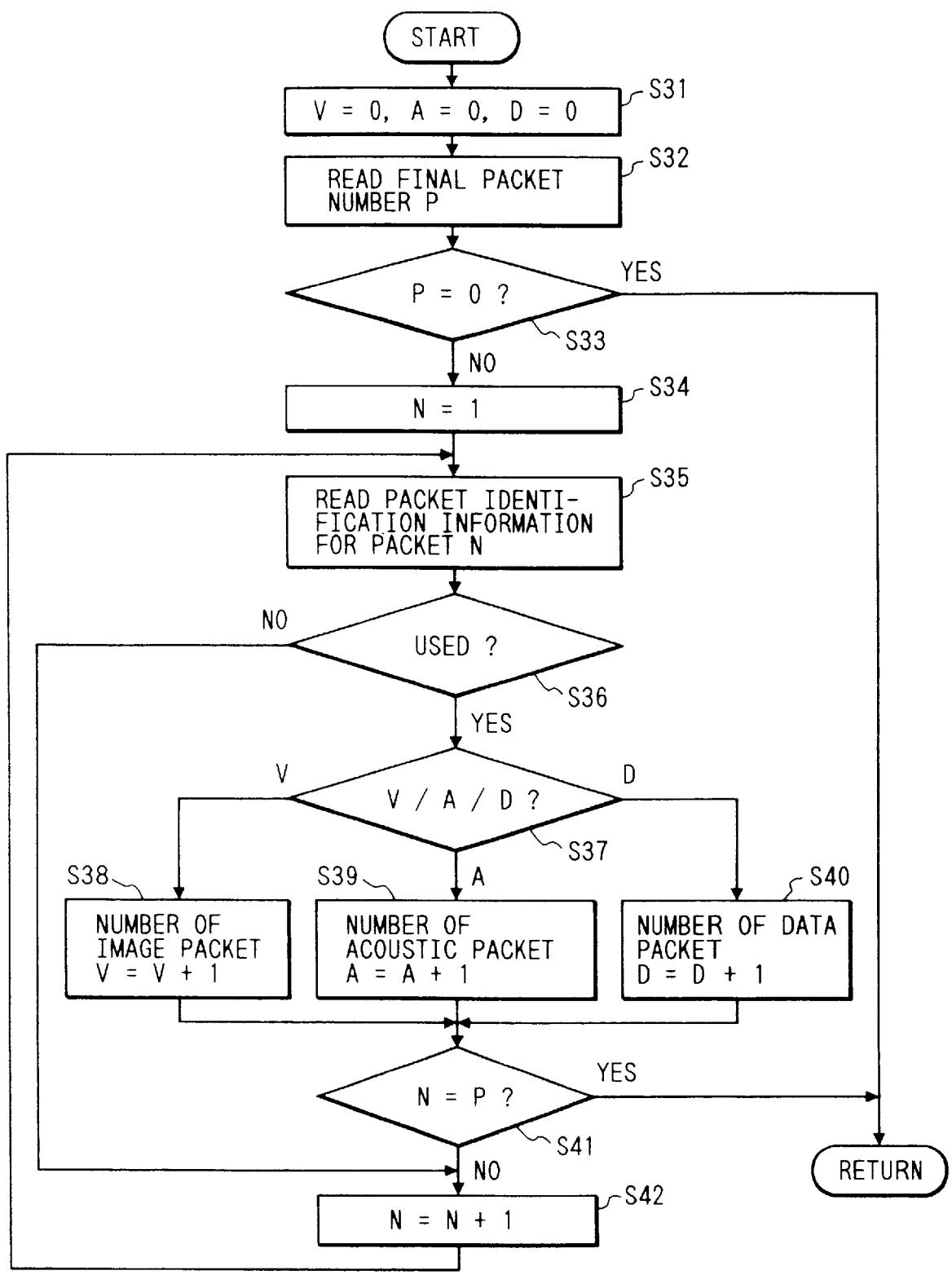
FIG. 13 shows a flowchart of a recorded packet search routine as shown at S7 in FIG. 11.

The detailed operation of S7 in FIG. 11 will be described below. FIG. 13 shows the flowchart thereof. The system control circuit 52 first initializes the variable V, A and D for the number of packets for the image, the voice and the data (S31), and the final packet number P recorded in the card maintenance area of the memory circuit 38 is read via the interface 34 and the memory control circuit 40 (S32). If P=0, the search sequence is terminated. If it is not zero, the loop variable N is initialized (S34), the packet identification information for packet N is read (S35). If the packet has not been used, the next packet is examined (S42), while if it has been used (S36), V, A or D is incremented (S38, S39, S40) depending on which of image, voice and data is recorded (S37). Each packet is investigated while N is incremented (S42) up to the final packet number P (S41).

Figure 14:
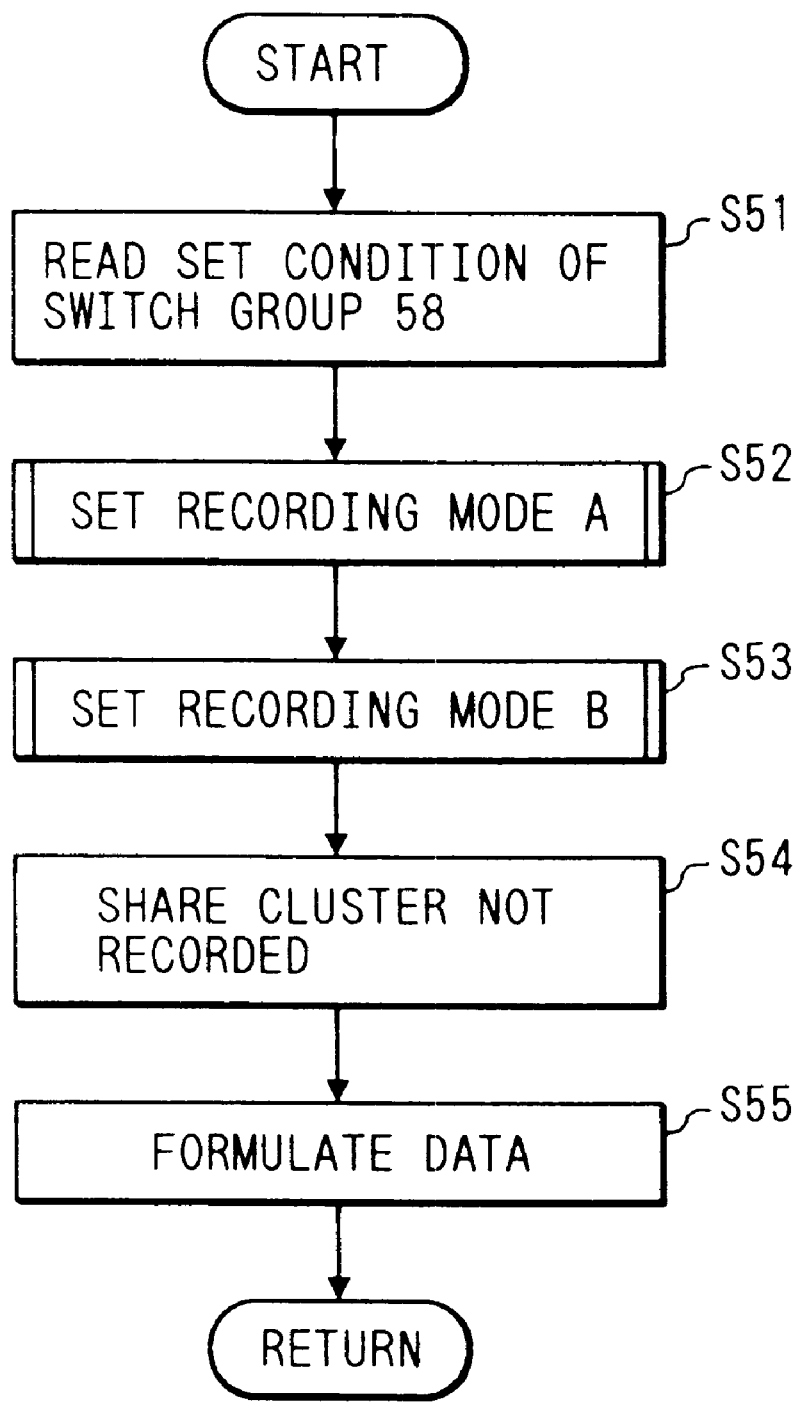
FIG. 14 shows a flowchart of a remainder indicating data formulating routine as shown at S8 in FIG. 11.

Next, the detailed operation of S8 in FIG. 11 will be described below. FIG. 14 shows the flowchart thereof. The system control circuit 52 reads the set condition of the switch group 58 (S51), and the recording mode A and the recording mode B are set (S52, S53). In the recording mode A, how to use and combine the packets for the image (V), the voice (A) and the data (D) is set, while in the recording mode B, the compression method, the compression ratio, and the recording amount for the image and the voice are set. After the mode setting is terminated, the unrecorded cluster is shared (S54), and the remainder indicating data is formulated (S55).

Figure 15:
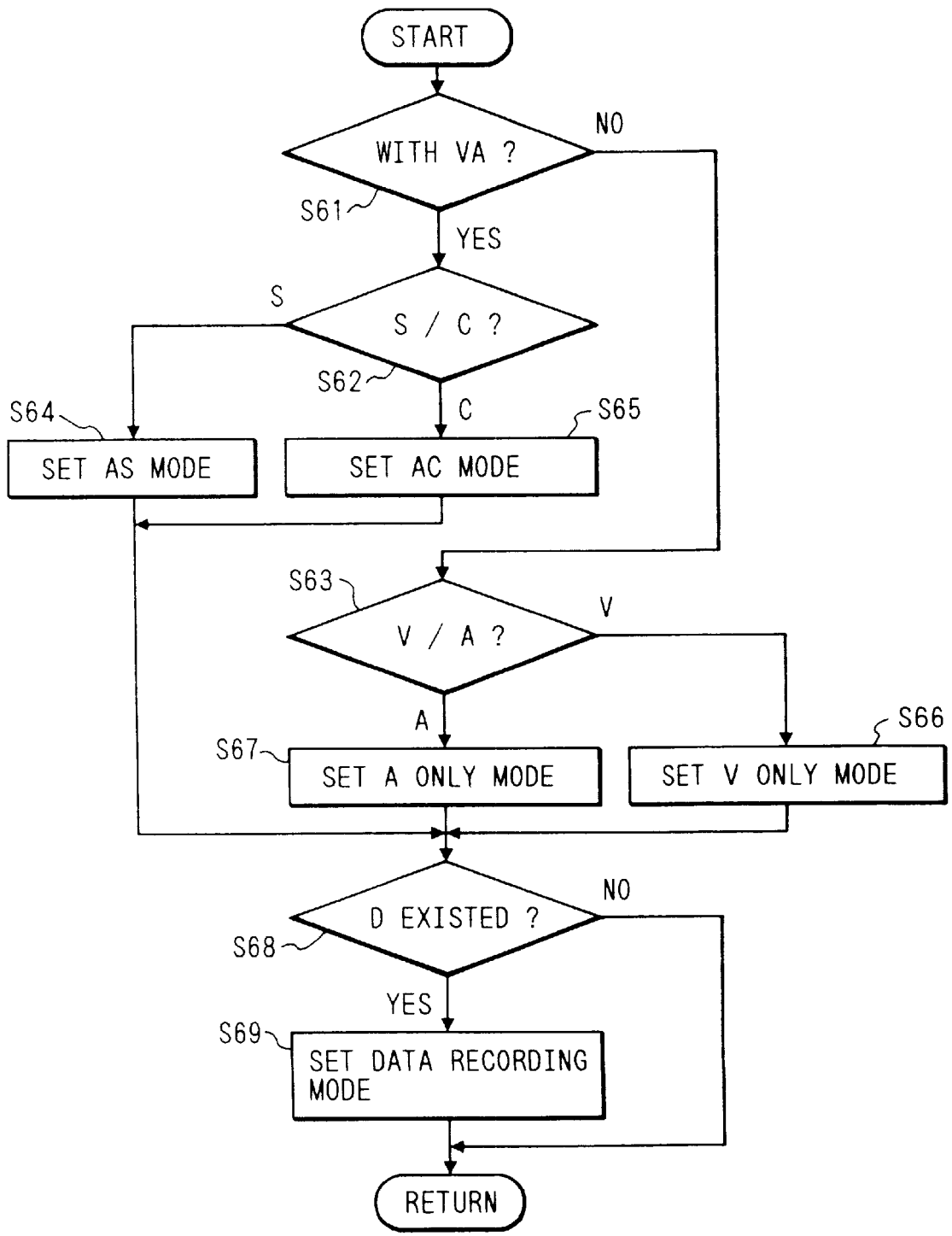
FIG. 15 shows a flowchart of a recording mode A setting routine as shown at S52 in FIG. 5.

The recording mode A setting sequence at S52 in FIG. 14 will be described below. FIG. 15 shows the flowchart thereof. First, a check is made to determine whether or not the recording is made in the combination of image (V) and voice (A) (S61). In the combinational recording, the continuous acoustic recording (AC) mode or the single acoustic recording (AS) mode is set (S64, S65), depending on the continuous recording or the single recording (S62). The single acoustic recording mode is one in which one sheet of image is recorded in a combination with one predetermined division of the voice, while the continuous acoustic recording mode is one in which one sheet of image is recorded in a combination with the voice of arbitrary length.

If the image and the voice are not recorded in the combination (S61), a "V ONLY" mode for the recording of the image and an "A ONLY" mode for the recording of the voice are set (S66, S67), depending on which of the image or the voice is recorded (S63).

When the data is recorded (S68), the data recording mode is set (S68, S69).

Figure 16:
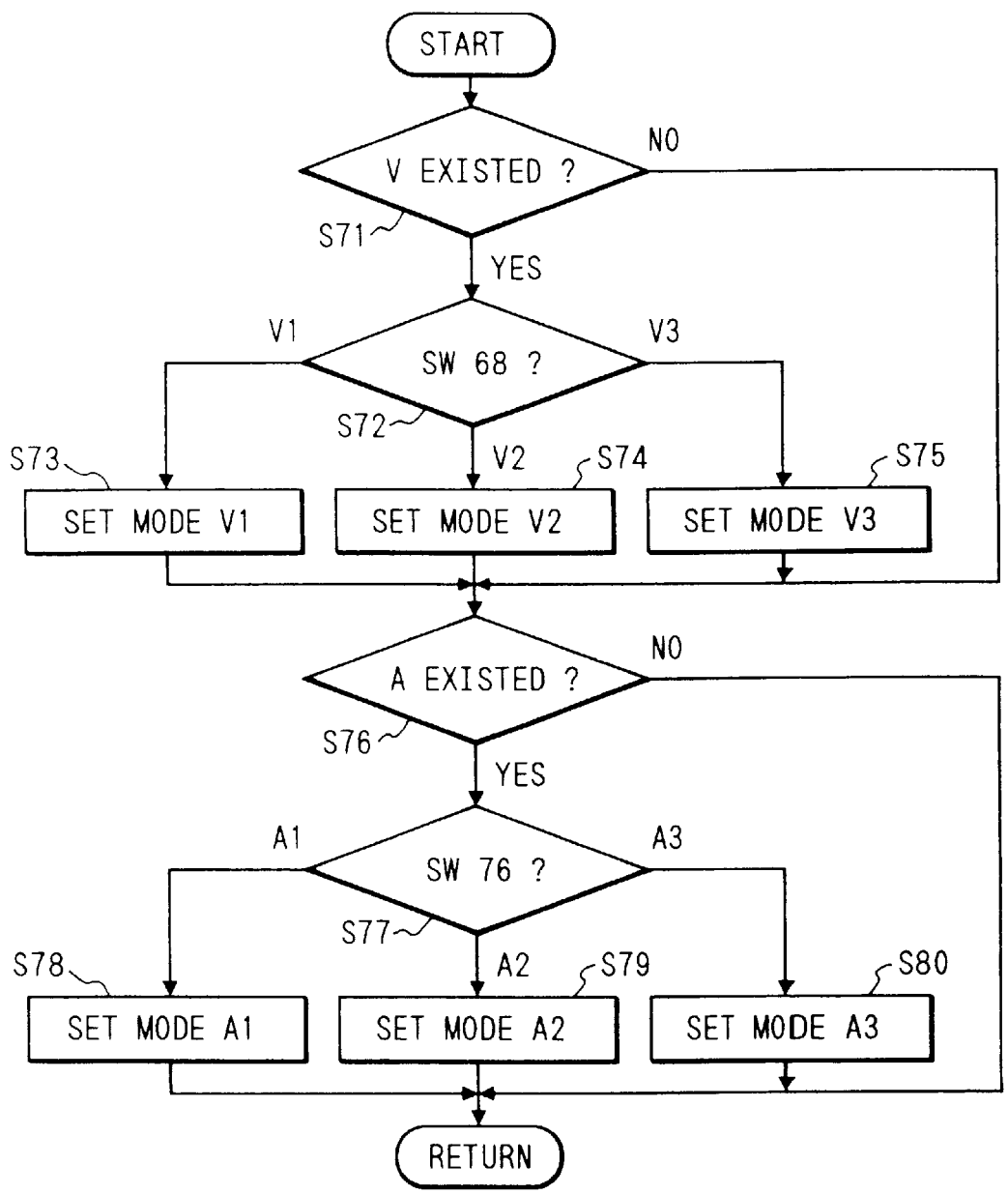
FIG. 16 shows a flowchart of a recording mode B setting routine as shown at S53 in FIG. 5.

Next, the details of the recording mode B setting sequence in FIG. 16 will be described below. When the image (V) is recorded (S71), one of the image modes V1, V2 and V3 which are different in the number of pixels, the compression method, the compression ratio and the aspect ratio of pixel is set, depending on the setting of the image mode switch 68 (S72). When the voice (A) is recorded (S76), one of the acoustic modes A1, A2 and A3 which are different in the compression method, the band, the number of channel, and the compression ratio is set (S78, S79, S80), depending on the setting of a combination designating switch 76 (S77).

Figure 17:
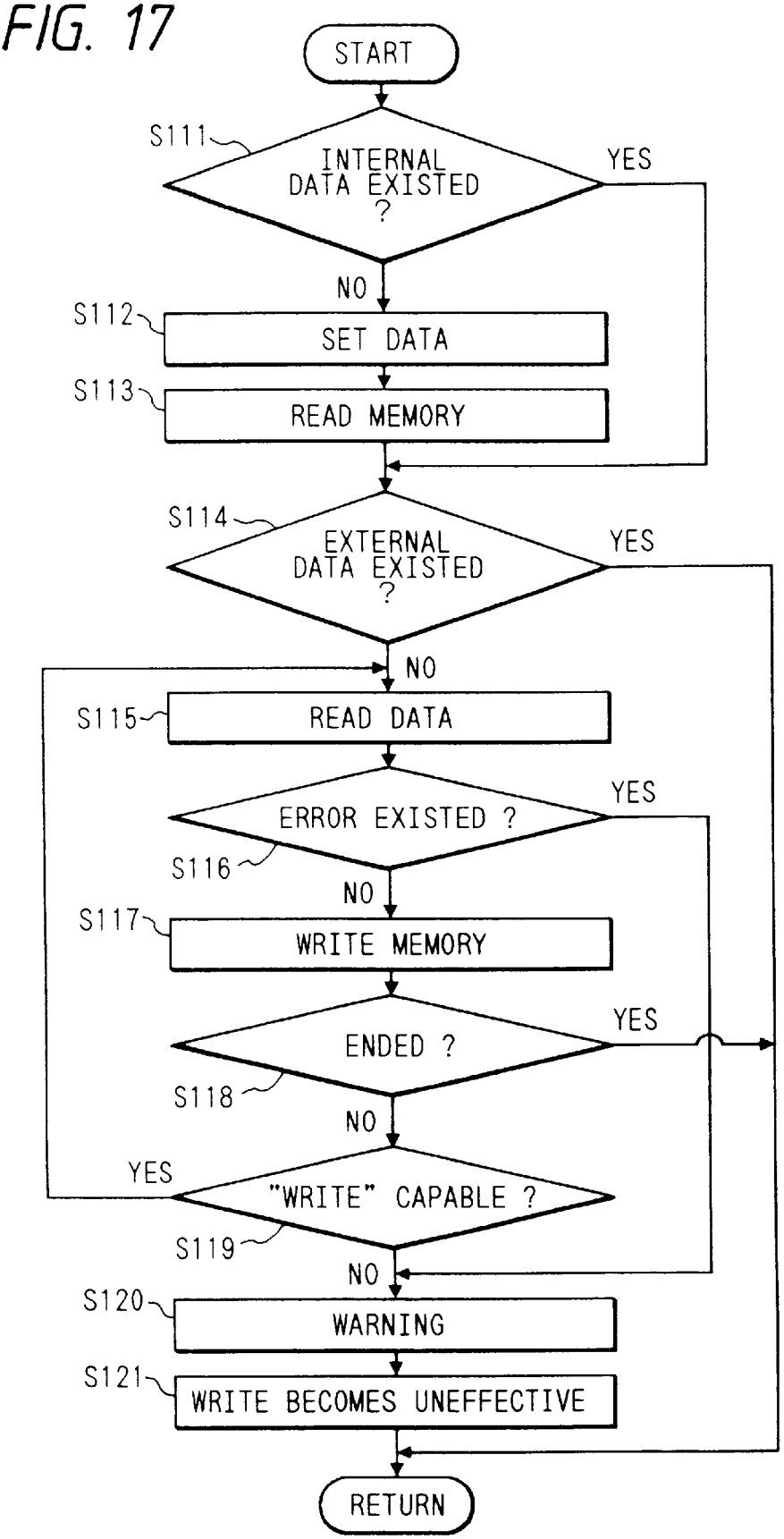
FIG. 17 shows a flowchart for the data recording in this example.

FIG. 17 shows a detailed flowchart of the data recording at S25 in FIG. 12.

First, a check is made to determine whether or not the internal data indicating the camera setting state at the photographing and the acoustic recording is recorded (S111). If the internal data is recorded, it is set into a register (S112), and written into the memory circuit 38 (S113). If the internal data is not recorded, S112 and S113 are bypassed.

Then a check is made to determine whether or not the external data is recorded (S114). If it is not recorded, this sequence is terminated. If it is recorded, the data is read via an external interface, and written into the memory circuit 38 (S117) if there is no error in reading the data (S116). If an error occurs in reading the data (S116), a warning is displayed (S120) and the external data which has been written is made invalid (S121).

After writing it into the memory circuit 38 (S117), S115 to S117 are repeated if the data recording is not ended (S118) and writable into a scheduled cluster (S119). Upon the indication that the writing of the external data is completed (S118), this sequence is terminated.

As can be easily understood from the above description, with this example, the user can know the use conditions, more specifically, the recorded conditions and/or the unrecorded conditions, thereby making it possible to avoid recording the voice into the unrecorded area unnecessarily, and to reserve the recording area for the expected image.

The operation of the fourth example according to the present invention will be described below.

In the apparatus as shown in FIG. 1, there are provided a reserve mode switch 80 for selecting the reserve mode to be used after the prereservation for the area of the memory circuit 38, and a reserve setting switch 82 for the reservation setting in the reserve mode.

Figure 18:
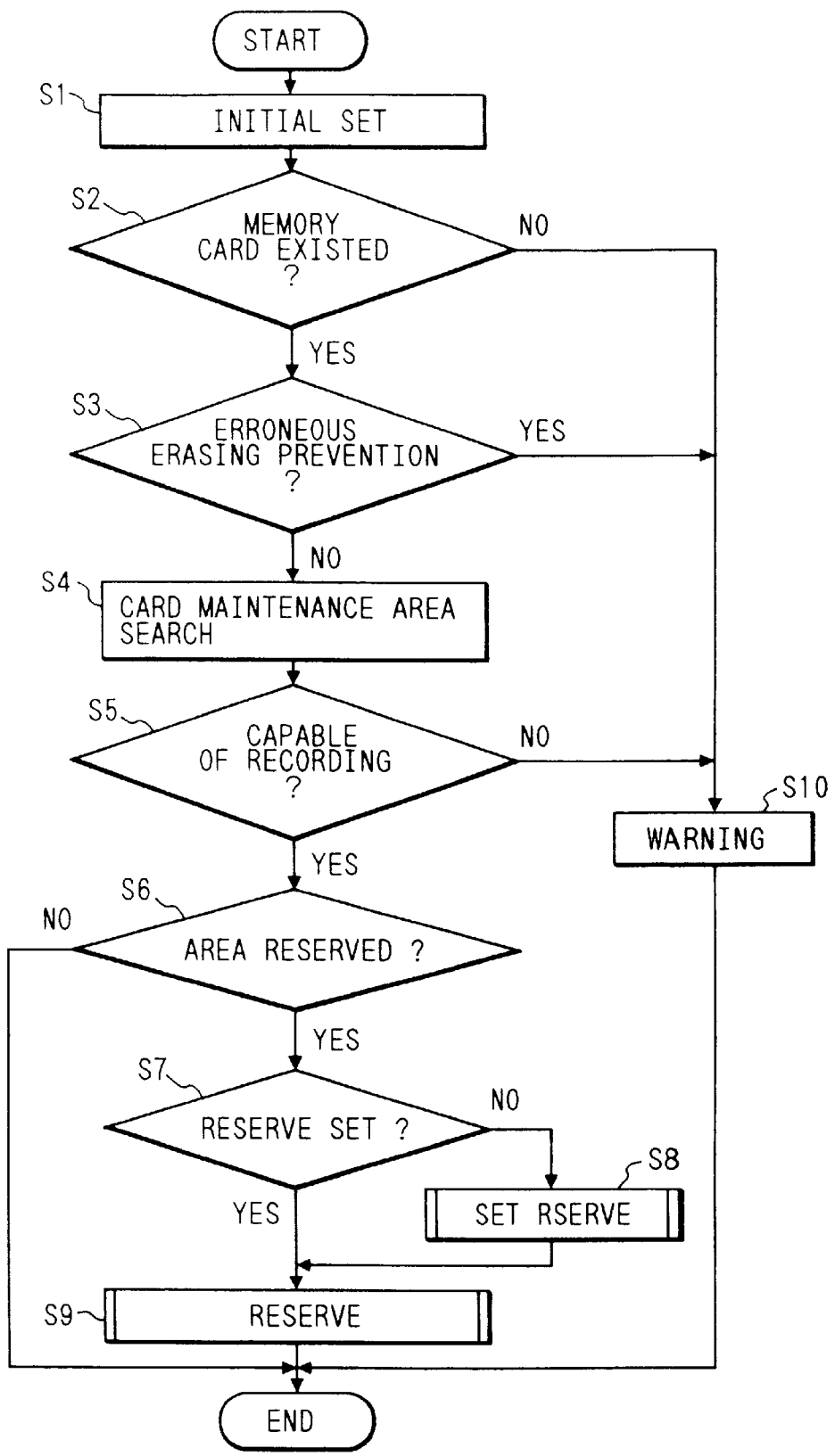
FIG. 18 shows a flowchart of the main routine in the third example.

Referring now to the flowcharts as shown in FIG. 18 and ensuing figures, the operation of this example will be described. FIG. 18 shows the flowchart of the main routine in this example.

When the data packet is used as the relating packet of the image packet, the number of clusters d for use in the data packet must be added to the number of clusters a for use in the image packet. Specifically, at S10 and S11 in FIG. 7, a=a1+d and a=a2+d are provided. And the information of the data packet must be written when the number of unrecorded clusters m is written together with other card maintenance data at S96 in the figure.

When the acoustic packet is used as the relating information of the image packet, the partner's packet number must be written into the packet relating information in the card maintenance data at one or both of S96 and S101 in FIG. 4.

When both the acoustic packet and the data packet are used as the relating information of the image packet, the number of the acoustic packet must be written into the packet relating information of the image packet, and the packet number of the data packet into the packet relating informations of the acoustic packet. When the data packet is mainly used, the number of the image packet must be written into the relating information of the data packet, and the packet number of the acoustic packet into the relating information of the image packet.

Upon turning on the power, the system control circuit 52 initializes the flags and control variables (S1), and if the main switch 60 is turned on, a check is made to determine whether or not the memory card 36 is set (S2). Then if the setting for the erroenous erasing prevention has been made on the set memory card 36 (S3), the card maintenance area is searched (S4). Based on a searched result, the recordable area is examined (S5). If the memory card 36 does not exist (S2), the erroenous erasing prevention is set, and there is no recordable area (S5), a warning is displayed and the processing is terminated (S10).

If the recording is possible (S5), a check for the area reservation is made by referring to the reserve mode switch 80 (S6). If the area reservation is made, a check is made to determine whether or not the necessary information for the area reservation (the type of reserved packet, the relating information, mode, the recording amounts, the combination of recording amounts) has been stored (set) in the ROM area of the memory 56 or the memory circuit 38 (S7). If it is not, a new reservation setting and the reservation are made (S8, S9), or otherwise, the reservation is made (S9). The reservation setting (S8) is made by using a switch from the switch group 58 or fetching it from the memory circuit 38 via the interface 34. The reservation (S9) is made specifically by writing the necessary data for reserving the unused area of the memory circuit 38 into a predetermined portion of the card maintenance area or the data area.

In this way, it is possible to reserve the area necessary for recording predetermined amounts of the image, the voice and the data into the memory card 36. Also, it is possible to reserve the storage area for recording the image, the voice and the data in a combination thereof.

Figure 19:
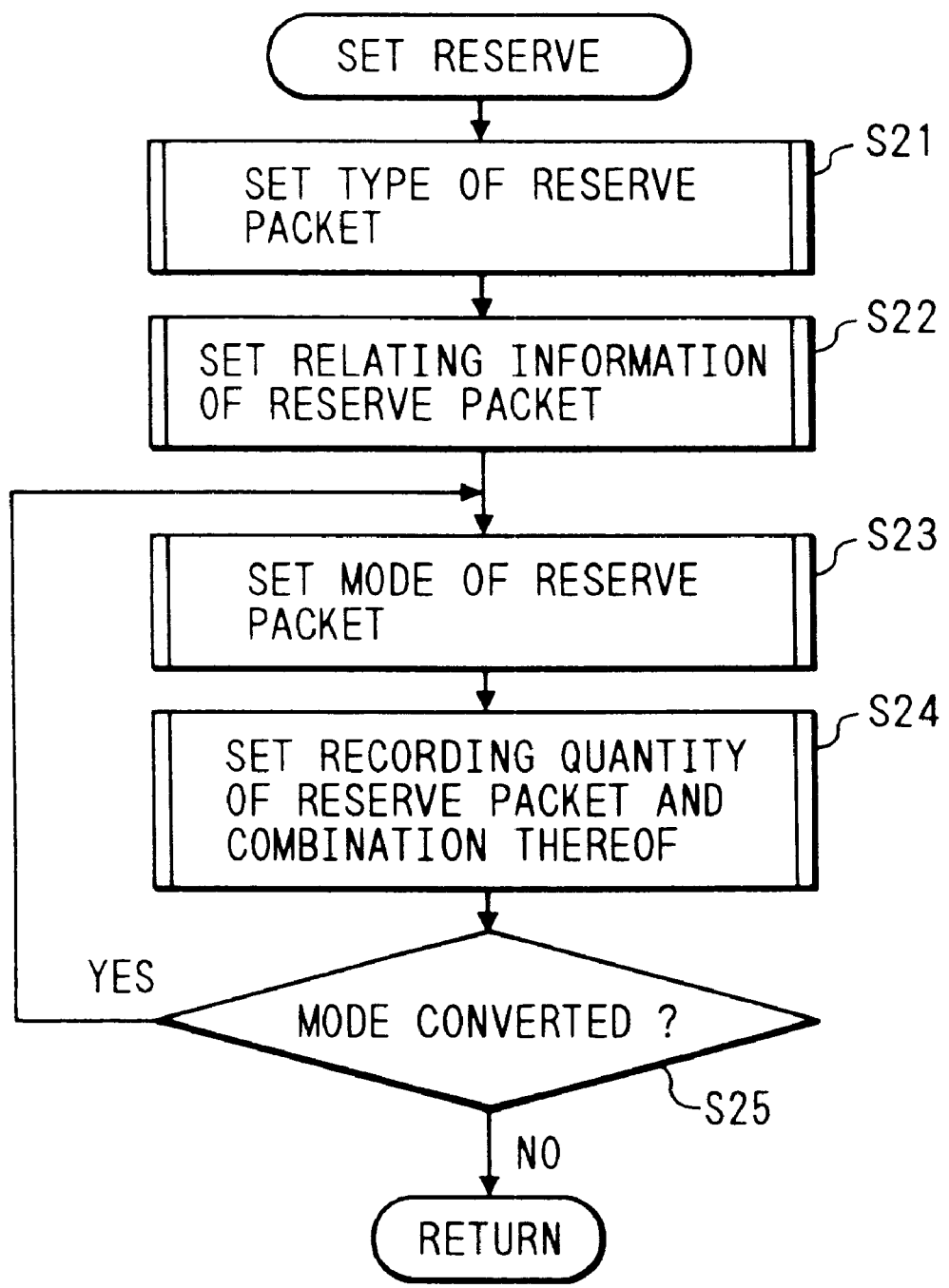
FIG. 19 shows a flowchart as indicated at S8 in FIG. 18.

FIG. 19 shows a flowchart of the reservation setting routine at S8 in FIG. 18. The system control circuit 52 first sets the type of reserve packet (S21). The types of packet include three ones of the image (V), the voice (A) and the data (D), which are arbitrarily settable. When it is desired to record all the three types of the image, the voice and the data, they are set. The setting is accomplished by displaying the setting examples on the display unit 54, and selecting a desired one with the reservation setting switch 76.

Next, the relating information of the reserve packet is set (S22). The packet number of the relating packet can be set to each packet, so that the recording and the reproduction are allowed in a combination of packets, for example, in a combination of packets for the image, the voice and the data, whereby such information is set.

After the relating information is set (S22), the recording mode of the reserve mode is set (S23). The compression mode is set if necessary. Then, the recording amount of the reserve packet and the combination thereof are set (S24). That is, based on the recording mode set at S23, the allocation of the recording amount of each packet type is determined. Also, when the relating information is set at S22, the allocation of the recording amounts in the combination of each packet type is determined. If the mode alteration is not necessary, the processing returns, and if it is necessary, S23 and S24 are repeated (S25).

Figure 20:
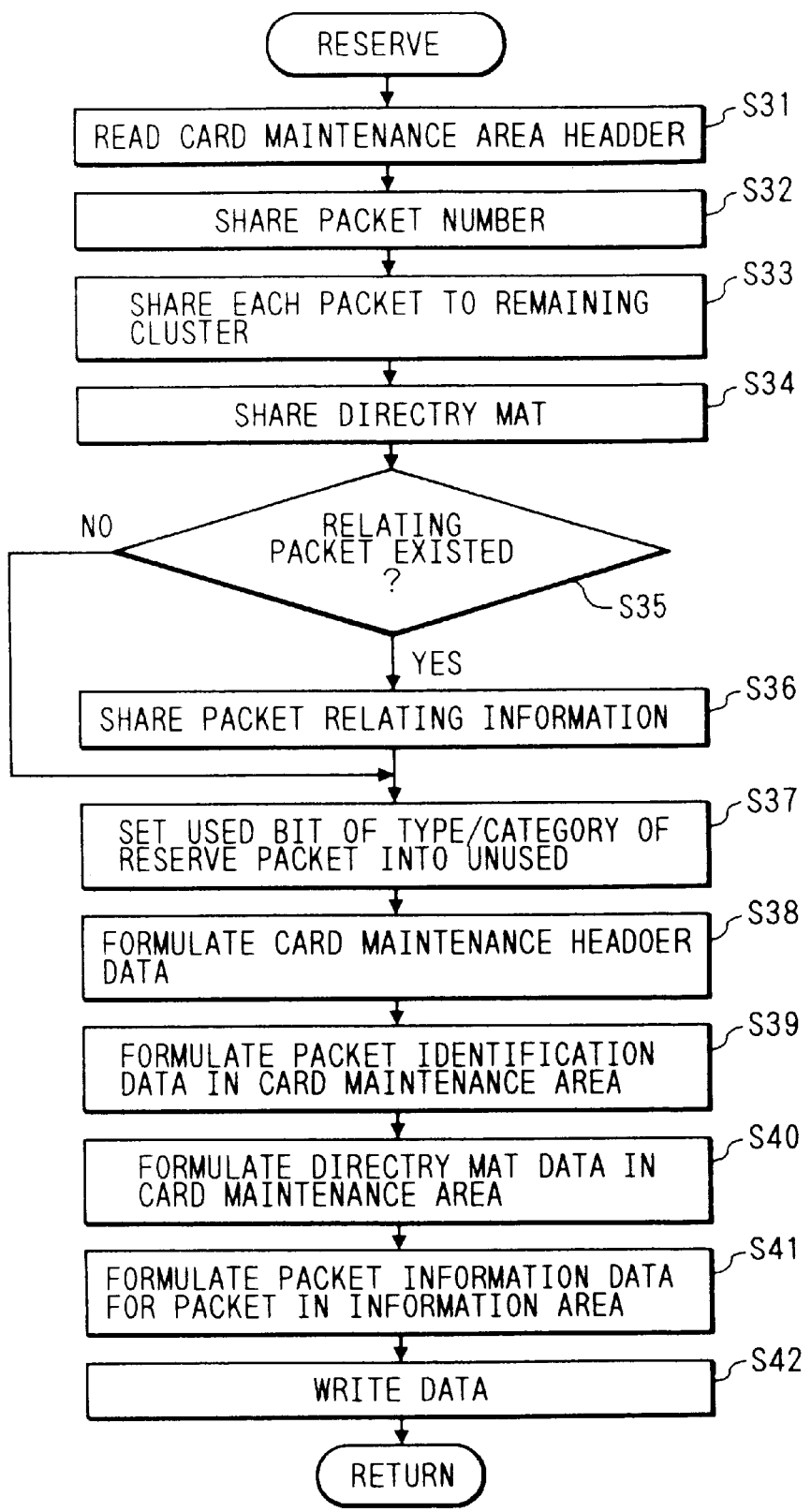
FIG. 20 shows a flowchart as indicated at S9 in FIG. 18.

FIG. 20 shows the flowchart of a reserve routine at S9 in FIG. 18. The number of remaining clusters, the number of used clusters, the final packet number and the first unused cluster number are read from the card maintenance Area of the memory circuit 38, and the usable cluster and packet number are read (S31). Based on the reserve packet type, the relating information, the mode, the recording amount and the combination thereof set at the reservation setting (S8), the packet number is shared (S32), each packet is shared to the remaining cluster (S33), and each data for the directory and MAT is shared (S34). If the relating information exists, the packet relating information data is shared (S35, S36). The used bits of the type/category for all the packets to be reserved are set into unused ones (S37). The header data, the packet identification data, the directory and MAT data for the card maintenance area, and the packet information data of the packet header in the information area are formulated (S38, S39, S40, S41), and the formulated data are written into the memory circuit 38 (S42).

Figure 21:
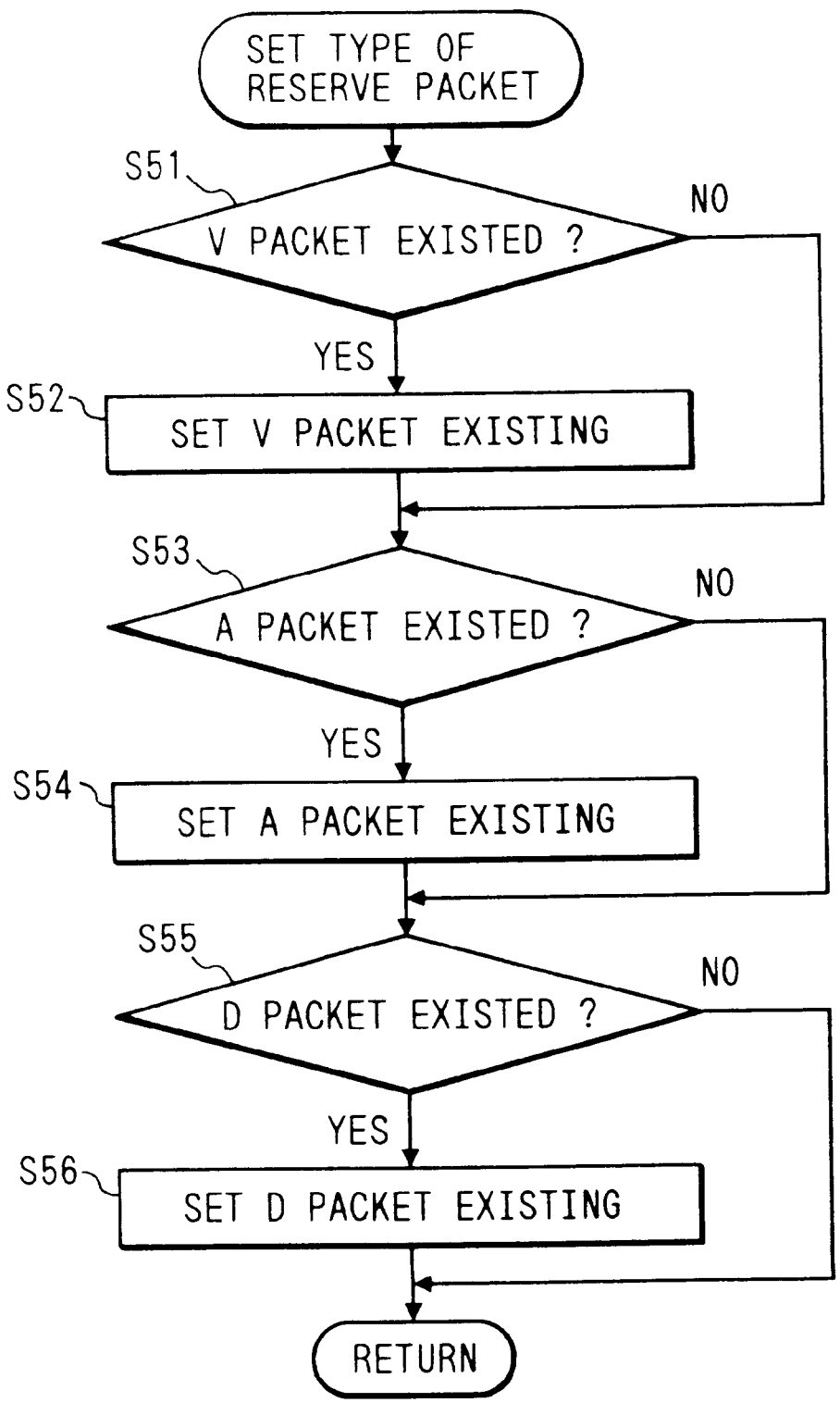
FIG. 21 shows a flowchart as indicated at S21 in FIG. 19.

FIG. 21 shows the flowchart of a reserve packet type setting routine at S21 in FIG. 19. When the image (V) packet is reserved, the image packet existing is set (S51, S52); when the acoustic (A) packet is reserved, the acoustic packet existing is set (S53, S54); and when the data (D) packet is reserved, the data packet existing is set (S55, S56).

Figure 22:
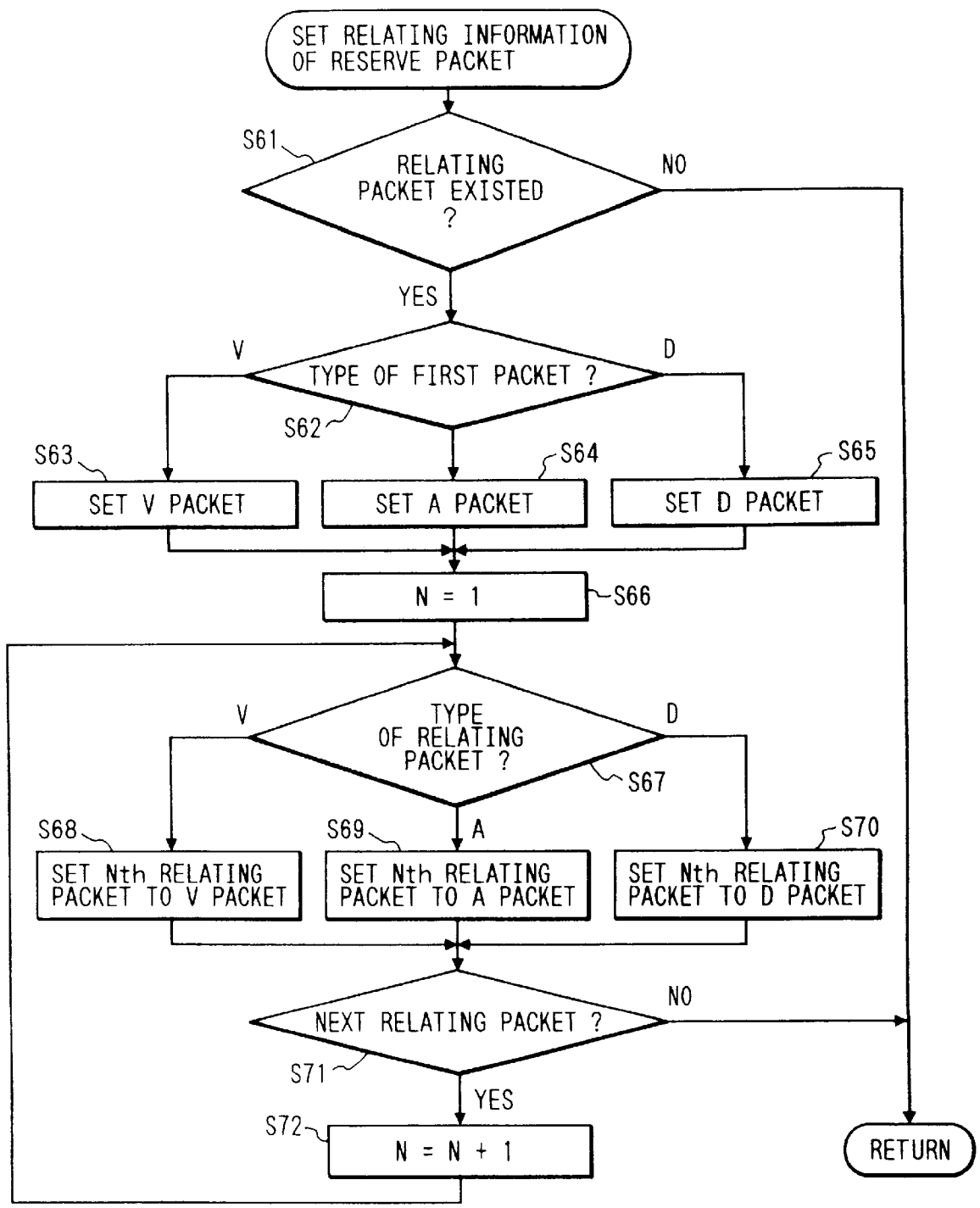
FIG. 22 shows a flowchart as indicated at S22 in FIG. 19.

FIG. 22 shows the flowchart of a reserve packet relating information setting routine at S22 in FIG. 19. First, a check is made to determine whether or not the relating information of reserve packet is set (S61), in which if it is set, the packet of the image (V), the voice (A) and the data (D) is set to the first packet (S63, S64, S65), depending on the type of the first packet (S62). A plurality of packets can be used in a combination by interrelating them in such a manner that the first relating packet number is recorded in the relating information data of the first packet, and the second relating packet number is recorded in the first relating packet. That is, the loop variable is set to 1 (S66), and the image (V) packet, the acoustic (A) packet or the data (D) packet is set to the N-th relating packet (S68, S69, S70), depending on the type of the relating packet (S67). If the next relating packet exists, the variable N is incremented (S72), and S67 to S70 are repeated. The settings at S63 to S65 and S68 to S70 can be accomplished by displaying the setting examples on the display unit 54, and selecting a desired one with the reserve setting switch 76.

Figure 23:
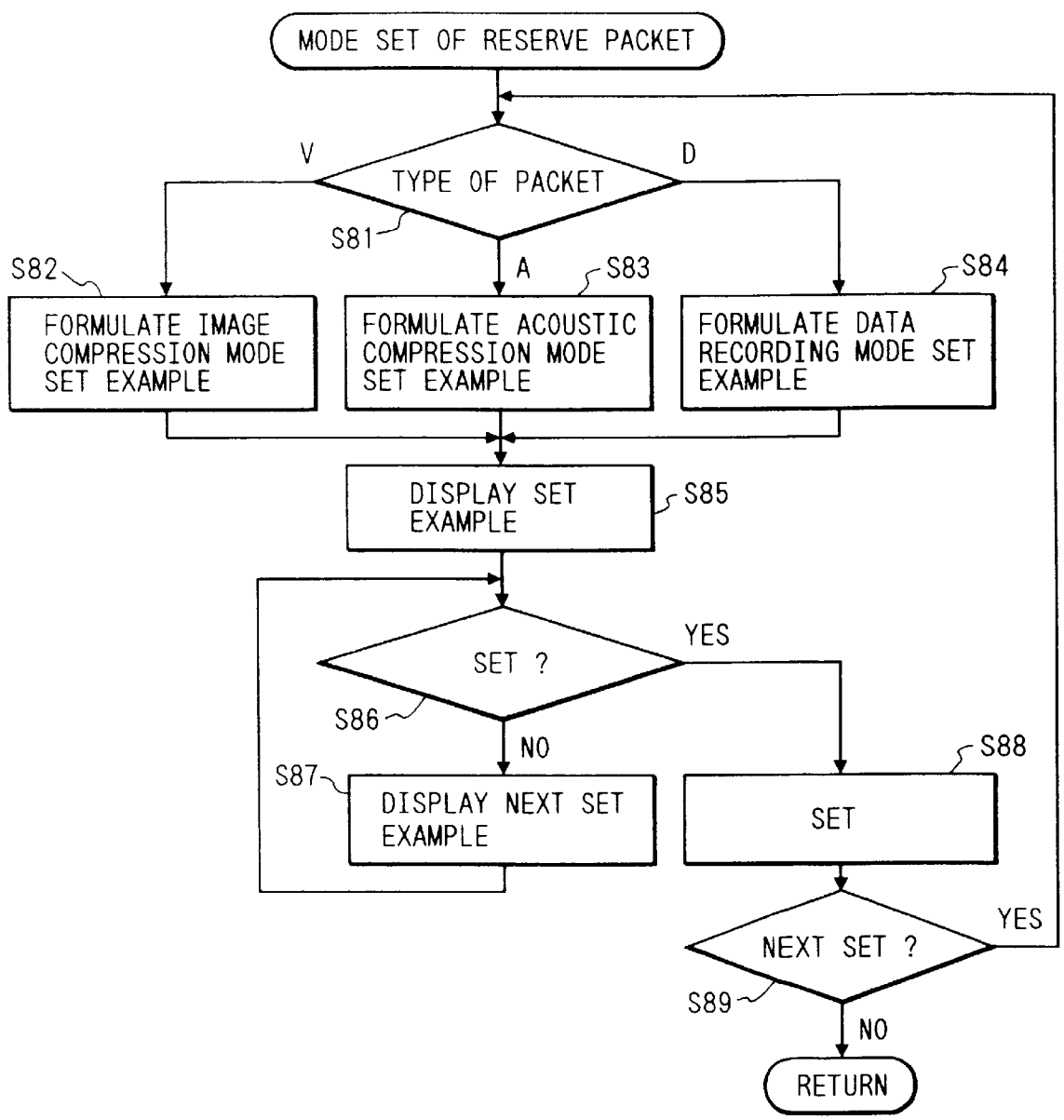
FIG. 23 shows a flowchart as indicated at S23 in FIG. 19.

FIG. 23 shows the flowchart of a reserve packet mode setting routine at S23 in FIG. 19. The image compression mode set examples, the acoustic compression mode set examples, or the data recording mode set examples are formulated (S82, S83, S84), depending on the type of packet for the mode setting (S81). The set example is displayed on the display unit 54 (S85), and selected if it is desirable (S86). That is, if not desirable, the next set example is displayed (S87). On the desired set example, the setting is made (S88), and if the next setting exists, the processing returns to S81, or otherwise, returns to the original routine (S89).

Figure 24B:
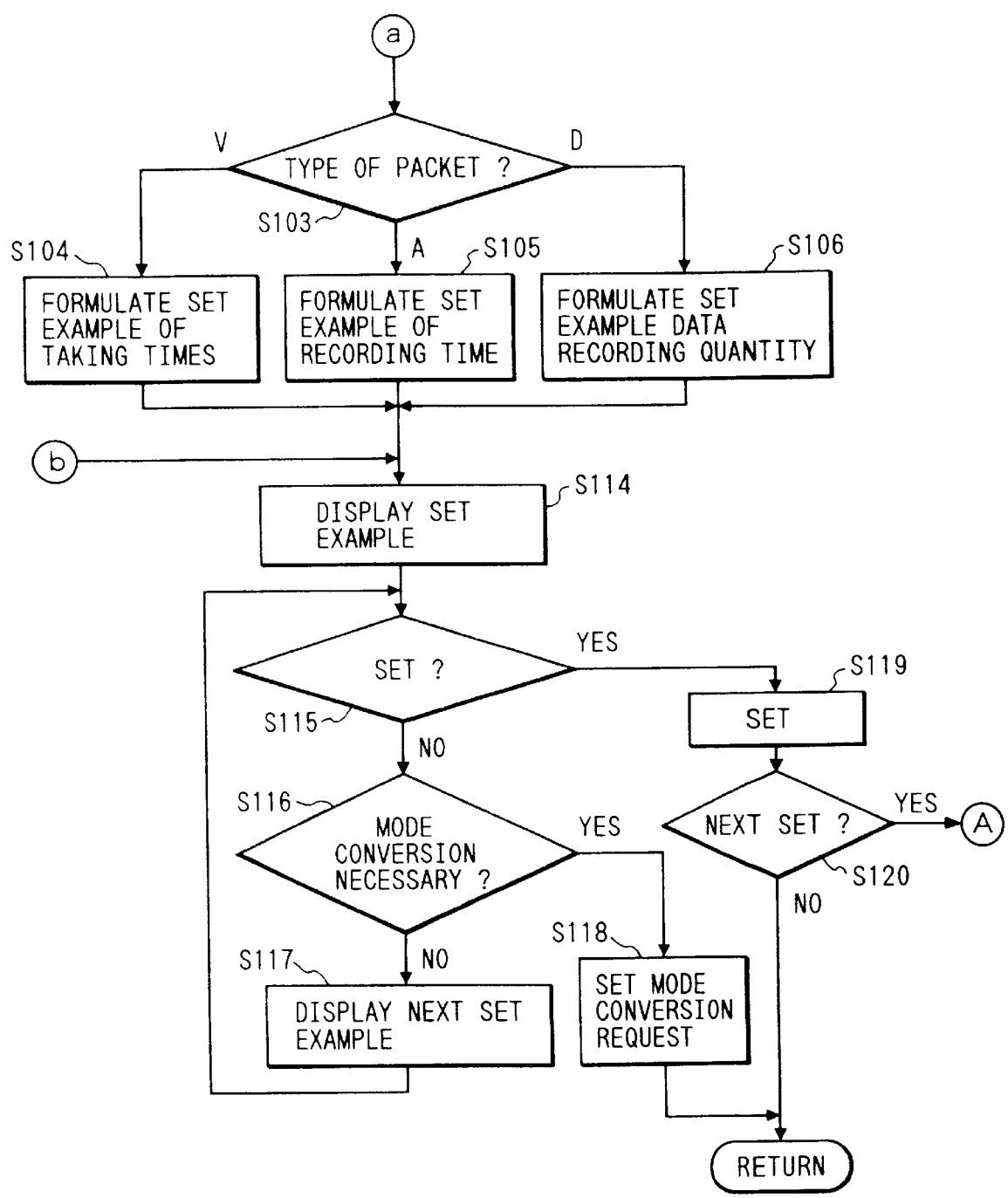
FIG. 24 shows a flowchart as indicated at S24 in FIG. 19.
Figure 26:
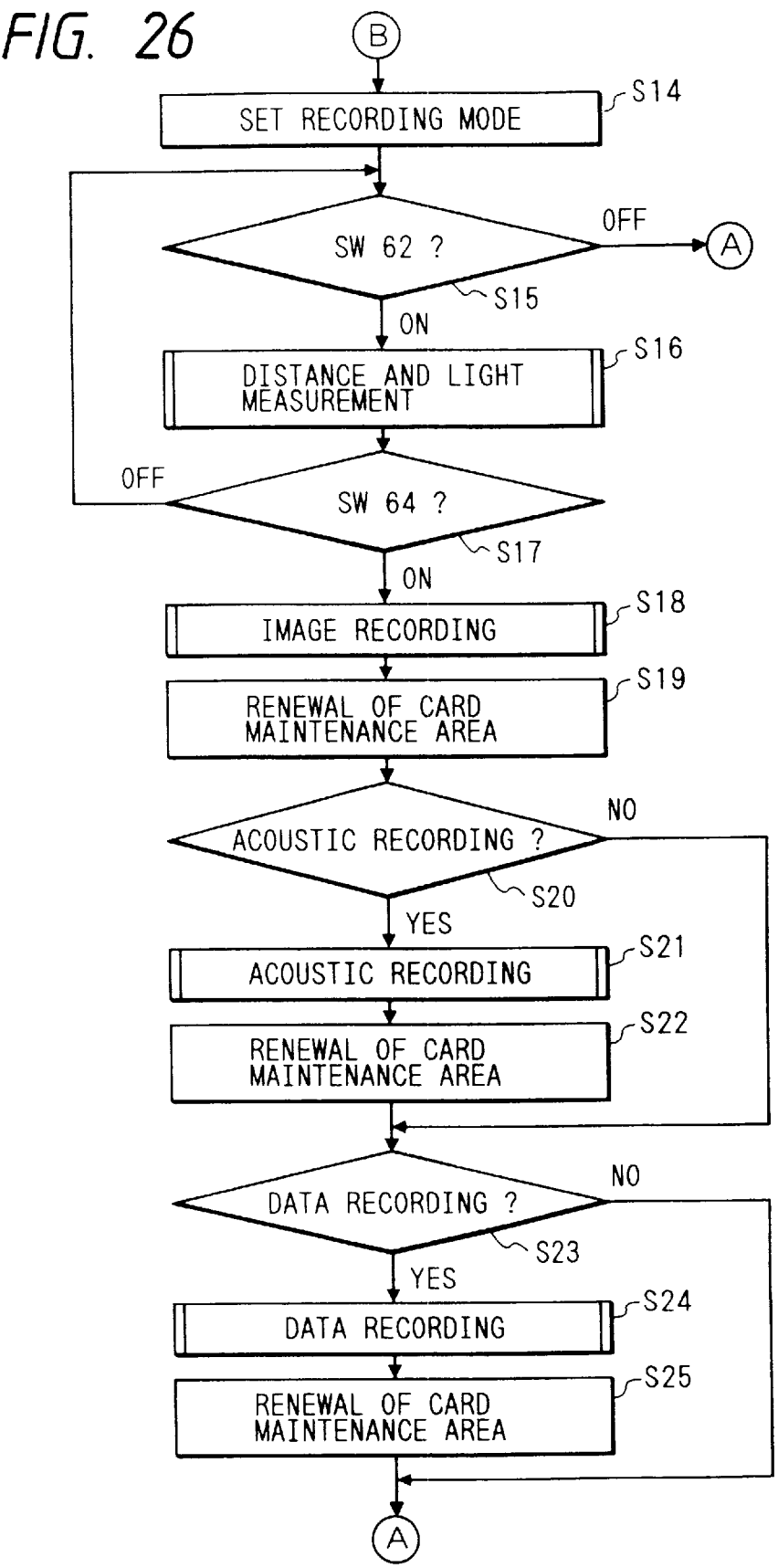
FIG. 26 shows a flowchart of the main routine, in part, in the fifth example.

FIG. 24 shows the flowchart of a setting routine for the recording amount of reserve packet and the combination thereof at S24 in FIG. 19. The system control routine 52 reads the number of remaining clusters from the card maintenance area header of the memory circuit 38 (S101) to increase or decrease the value of the set example for the recording amount as will be described later, depending on the number of remaining clusters. Then a check is made to determine the presence or absence of the relating packet (S102) based on the relating information set at S21. If no relating packet exists (S102), the set example for the taking times, the recording time, or the data recording amount is formulated (S104, S105, S106), depending on the type of packet (S103). If the relating packet exists (S102), the set example for the taking times is formulated for the image (V) packet (S107, S108), the set example for the recording time is formulated for the acoustic (A) packet (S109, S110), and the set example for the data recording amount is formulated for the data (D) packet (S111, S112), whereby the set example for the combination of the recording amounts is formulated (S113).

The set example is displayed on the display unit 54 (S114). If the set example is desirable (S115), it is set (selected) with the reserve setting switch 76 (S119). If it is undesirable (S115), a mode change request flag is set when the mode change is necessary (S118), or the next set example is displayed when the mode change is unnecessary (S117). In this way, the desirable set example is selected and set (S119), and if the next setting exists, the processing returns to S102, or otherwise, it is terminated (S120).

As can be easily understood from the above description, with this example, it is possible to record the images in the expected number of sheets, the voice in the expected recording time, and the data in the expected recording amount in a reliable manner. Also, it is possible to record the image, the voice and the data of the expected amounts in a combination thereof, by prestoring the relating information of the image, the voice and the data.

The fifth example of the present invention will be described below.

In this example, like the fourth example, there are provided a reserve mode switch 80 and a reserve setting switch 82 for the reserve setting in the reserve mode.

Referring now to FIGS. 25 to 28, the operation of this example will be described below. FIGS. 25 to 28 show the flowchart of the main routine in this example as a whole.

Upon turning on the power, the system control circuit 52 initializes the flags and control variables (S1), and if the main switch 60 is turned on (S2), a check is made to determine whether or not the memory card 36 is set (S3). Then a check is made to determine whether or not the erroneous erasing prevention is set on the set memory card 36 (S4). When the memory card 36 is not set and the erroneous erasing prevention is set, a warning is displayed on the display unit 54, and the processing returns to S2 (S11).

If the erroneous erasing prevention is not set (S4), and the recorded content of the card maintenance area of the memory card 36 is necessary to read (S5), the recorded content of the card maintenance area is read (S6). For example, when the card maintenance area is already read, this reading is unnecessary, and therefore S6 to S9 are bypassed.

After reading the card maintenance area (S6), if the reverse mode switch 74 is on (S7), and if there is any packet in which the used bit in the type/category data of the packet identification in the card maintenance area is unused (S8), various data stored in the packet information of the packet header in the information area are read from the memory circuit 38 (S9). If the reserve mode switch 74 is off (S7), or if no reserve packet exists (S8), the information area is not read (S9).

The system control circuit 52 determines whether or not the recording is possible, based on the information of the card maintenance area read at S6 (or more previously), particularly, the data relating to the number of remaining clusters, and the information of reserve packet obtained at S7 and S8 (S10), in which if the recording is not possible, a warning is displayed on the display unit 54 and the processing returns to S2 (S11), while if it is possible, the presence or absence of the relating packet is determined (S12). Specifically, when recorded into the reserve packet, the presence or absence of the relating packet is determined from the relating information data of the packet identification of the card maintenance area, or when not recorded into the reserve packet, the presence or absence of the relating packet is determined depending on whether the setting for providing the relating packet is made with the switch group 58. If the relating packet exists (S12) and is recorded into the reserve packet, the combination of the relating packets is determined in accordance with the relating information data of the packet identification of the card maintenance area, while if not recorded into the reserve packet, the combination of the relating packet is determined in accordance with the settings of the switch group 58 and set in the memory 56 (S13).

Next, the system control circuit 52 sets the recording mode in accordance with the packet information data in the packet header of the information area obtained at S9, when recorded into the reserve packet, while it sets the recording mode in accordance with the settings of the switch group 58, when not recorded into the reserve packet (S14).

The steps from S2 to S14 are repeated until the distance measurement and light measurement switch 62 is turned on (S15). If the distance measurement and light measurement switch 62 is turned on (S15), the distance measurement and the light measurement are performed (S16). The distance measurement and the light measurement are performed (S15, S16), until the release switch 64 is turned on (S17), and while the distance measurement and light measurement switch 62 is on. If the release switch 62 is turned on (S17), the photographing (image recording) is made (S18), and the card maintenance area of the memory circuit 38 is updated (S19).

In accordance with the combination of the relating packet set in the memory 56, if the acoustic recording is indicated (S20), the acoustic recording and the update of the card maintenance area are made (S21, S22), and if the data recording is indicated (S23), the data recording and the update of the card maintenance area are made (S24, S25).

Thereafter, the processing returns to S2, and the steps from S2 to S25 are repeated.

Figure 27:
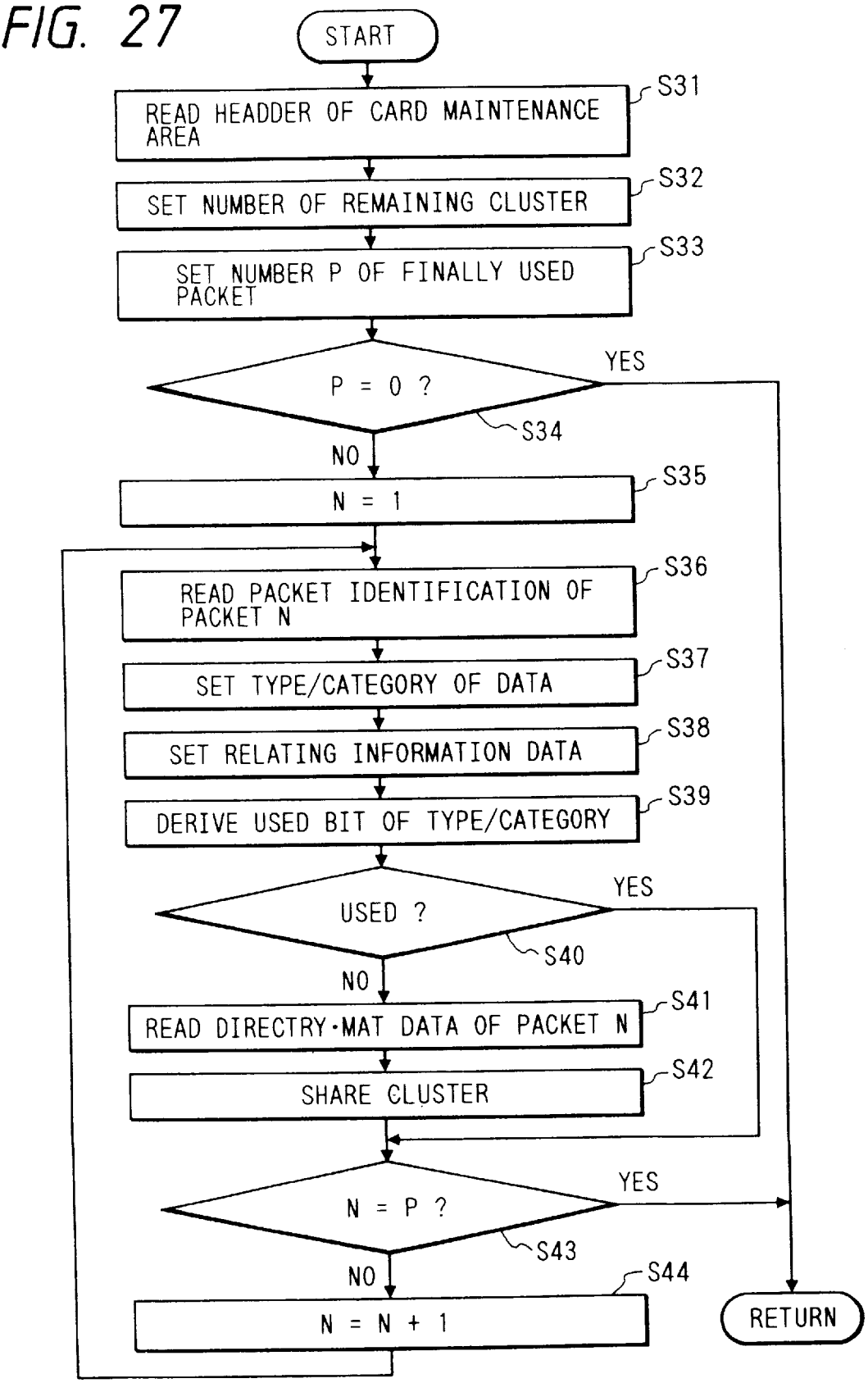
FIG. 27 shows a flowchart as indicated at S6 in FIG. 25.

The operation at S6 in FIG. 25 will be described in detail. FIG. 27 shows the flowchart thereof. The system control circuit 52 reads the header of the card maintenance area of the memory circuit 38 (S31), and sets the header data for the number of remaining clusters into the memory 56 (S32). Also, the final packet number is set in the memory 56, and stored as P in the internal register (S33). If P is zero, the processing returns (S34), while if it is not zero (S34), each packet is examined in the following manner.

That is, first, the loop variable N is set to 1, and the packet identification data for the packet N is read from the card maintenance area of the memory circuit 38 (S36). The type/category data is set in the memory 56 (S37), and the relating information data is set in the memory 56 (S38). The used bit of the type/category is picked up (S39), and a check for the status of the used bit is made (S40). If it is not used (S40), the data of the packet N in the directory and the memory allocation table (MAT) is read from the card maintenance area of the memory circuit 38 (S41), and the cluster for the packet N is shared (S42). If it is used, S41 and S42 are bypassed because the packet is not a reserve packet.

The variable N is incremented in sequence (S44) until the final packet P is investigated (S43), and the steps of S36 to S42 are repeated. If N is equal to P, the processing returns (S43).

Figure 28:
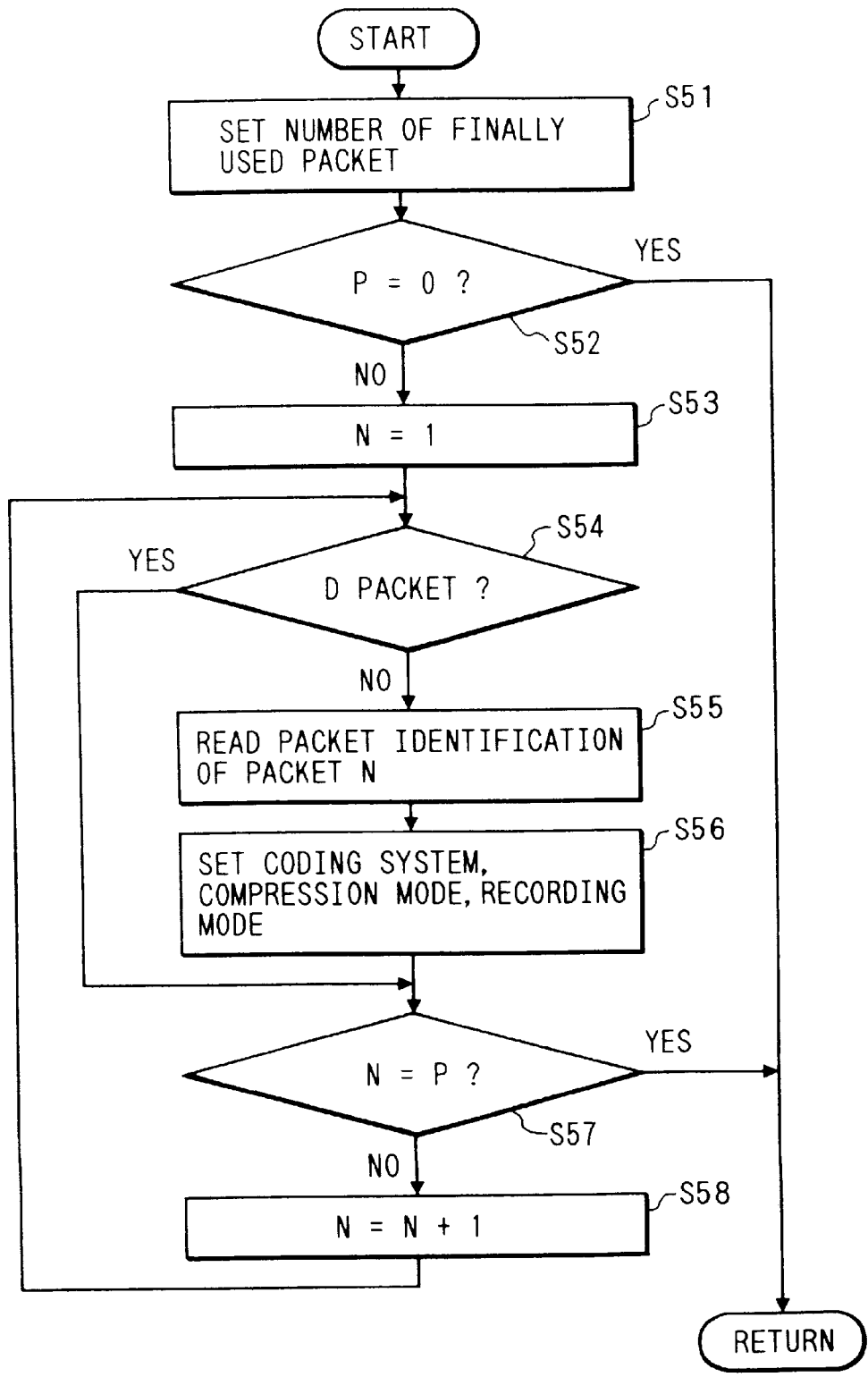
FIG. 28 shows a flowchart as indicated at S9 in FIG. 25.

Next, the operation at S9 in FIG. 25 will be described below. FIG. 28 shows the flowchart thereof. The system control circuit 52 stores the final packet number obtained from the header of the card maintenance area as P into the internal register (S51). If P is equal to zero, the processing returns (S52), while if P is not equal to zero (S52), each packet is investigated in the following manner. That is, first, the loop variable N is set to 1, and a check is made to determine whether or not the packet N is a data packet based on the type/category data of the packet identification in the card maintenance area (S54). If it is not (S54), the packet information of the packet N is read from the packet header of the information area (S55), and the coding method, the compression mode and the recording mode are set in the memory 56 (S56). Or otherwise (S54), S55 and S56 are bypassed.

The variable N is incremented in sequence (S58) until the final packet P is investigated (S57), and the steps of S54 to S56 are repeated. If N is equal to P, the processing returns (S57).

As can be easily understood from the above description, with this example, a plurality of kinds of the information signal (e.g., image, voice and data) are recorded in accordance with the reserve information preset in the recording medium, so that it is possible to record the expected amount of each signal in a reliable manner. Also, it is possible to store the information signals in an expected combination by prestoring the relating information between the signals.

Figure 30B:
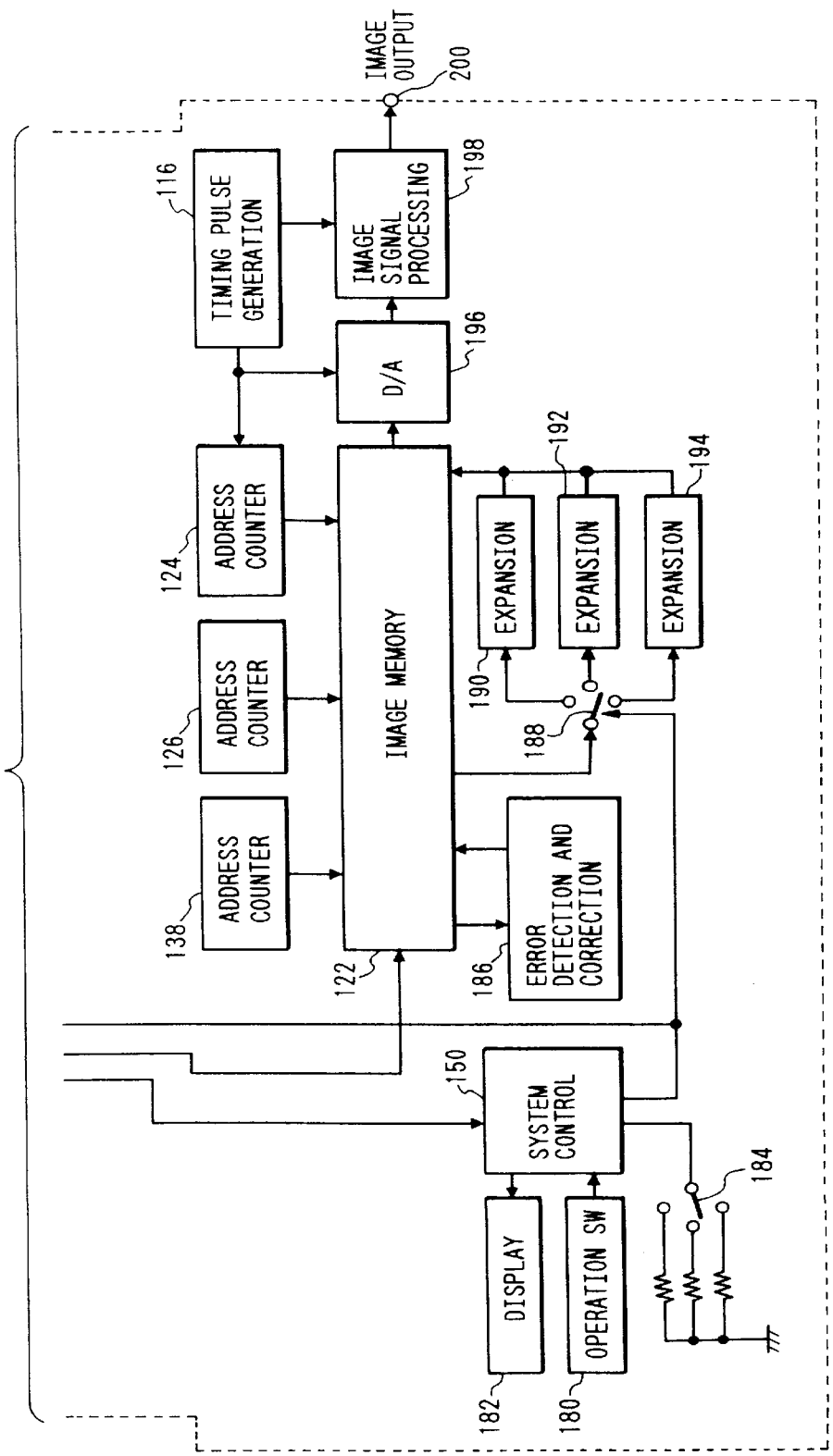
FIG. 30, consisting of FIGS. 30A and 30B shows a constitutional block diagram of a reproduction system.

Referring now to the drawings, the sixth example of the present invention will be described in which the present invention is applied to an electronic still camera. FIG. 29 shows a constitutional block diagram of a recording system in one example of the present invention, and FIG. 30 shows a constitutional block diagram of a reproduction system. The like numerals are attached to the common components in the recording system and the reproducing system.

In FIGS. 29 and 30, A is a camera body, and B is a memory card detachable from the camera body A. The storage area for the memory card B is separated into a card maintenance area and a data area which is divided in a unit of clusters. The information of the image, voice and data to be recorded is handled in a unit of packet. The card maintenance area is comprised of a header, a packet discrimination, a directory and a memory allocation table. The header includes a formal number, a card number, the number of remaining clusters, the number of used clusters, the final packet number, the start unused cluster number, and a card label. The packet discrimination is comprised of the type and category of each packet recorded, and the relating information of packet. The directory is comprised of the number of start cluster for each packet. The memory allocation table contains the cluster number to be connected to each cluster.

The data area is handled logically in a unit of packet. The packet is comprised of a packet header and a packet data of arbitrary length. The packet header is comprised of the packet information, the data and a title. The packet information includes the coding method, the compression mode and the recording mode for the image or voice. For the image, it further includes the number of horizontal and vertical pixels and the aspect ratio of pixel. The packet is recorded in the memory 138, physically distributed into a plurality of clusters.

First, the fundamental operation of the recording system as shown in FIG. 29 will be described below. The procedure for storing the image information into he memory card B is as follows. That is, an object image is entered through a taking lens 110 onto a photoelectric conversion face of an image pickup device 114 for a predetermined period, with the action of a shutter 112, the image pickup device 114 serving to convert an optical image into an electric signal. An image signal of the image pickup device 114 is output at the timing pulse from a timing pulse generating circuit 116, and transformed or separated into a brightness signal and a color signal by a video signal processing circuit 118 to be supplied to an A/D converter 120. The A/D converter 120 converts an analog input into digital form at the timing pulse from the timing pulse generating circuit 116 to apply it to an image memory 122. An address counter 122 increments the holding address in accordance with the timing pulse from the timing pulse generating circuit 116, and an output data from the A/D converter 120 is written at an address indicated by the address counter.

If one picture of image data is written in the image memory 122, the stored data in the image memory 122 is read from the address indicated by the address counter 126, and applied to one of the data compression circuits 132, 128, 130 having different compression methods or compression ratios (e.g., circuit 126), which is selected by the use of a switch 134. The compression method involves, for example, an adaptive differential PCM (ADPCM) or an adaptive discrete cosine transformation. The data compressed by the data compression circuit (e.g., circuit 126) is written again into the image memory 122.

The compression by the compression circuits 128, 130 and 132 may be realized in different compression methods or different compression ratios in the same compression method.

The compression processing for one picture of image data is terminated, an error correction code generation circuit 136 generates an error correction code (CRC or read Solomon code) in a unit of a predetermined number of compression data. This error correction code is written at a predetermined address, along with the compression data stored in the image memory 122. The image data (compression data) having the error correction data added is read from the address specified by the address counter 138, and supplied via an interface 140 for the memory card to an external memory card B.

The memory card B is comprised of an interface 144, a memory control circuit 146 and a memory circuit 148. Prior to storing the image data, the system control circuit 150 supplies the management data (first cluster number, category of stored data, data compression method, correspondence relation with other stored data) via the interface 140 to the memory card B, the memory control circuit 146 sets a first cluster number for starting the storage to a cluster address pointer, based on this management data, and resets a memory address pointer pointing to the memory address with the cluster. And it stores the data supplied via the interface 144 at an address in the memory card 148, which is pointed to by the memory address pointer, and increments the memory address pointer to prepare for the storage of next data. This operation is repeated for each predetermined amount of image data until one sheet of image data is stored in the memory circuit 148.

Note that the system control circuit 150 interrupts temporarily the transfer of image data to the memory card B, if it confirms that the image data (or the acoustic data) is stored in one cluster in the memory circuit 148 (in practice by counting the number of transfer data by the counter). At the time when the memory card B is connected to the camera body A, the memory management data of the memory card B is read and stored as the search data in the memory, not shown, whereby the system control circuit 150 examines the number (address) of unused cluster at which the image data can be stored next, and transfers the obtained cluster number to the memory control circuit 146 of the memory card B. The memory control circuit 146 sets the transferred cluster number to a cluster address pointer, and resets the memory address pointer. The system control circuit 150 resets a counter for counting the number of transfers after transferring the cluster number to the memory control circuit 146, and resumes the transfer of the image data.

After one sheet of image data is stored in the memory card B in the above described manner, the system control circuit 150 transfers the management data to the memory card B. This management data is stored in a predetermined area of the memory circuit 148 by the memory control circuit 146. Thereby, the recording of the image is registered.

The processing procedure for recording the acoustic information to the memory card B is as follows. That is, the acoustic signal output from a microphone 152 is amplified by an amplifier 154, and its noise is reduced by a noise reduction circuit 156. An A/D converter 158 converts an output of the noise reduction circuit 156 into digital form at the timing pulse from a timing pulse generation circuit 160 to apply it to an acoustic memory 162. An address counter 164 increments the holding address in accordance with the timing pulse from the timing pulse generating circuit 160, and an output data from the A/D converter 158 is written at an address indicated by the address counter 164.

The system control circuit 150 selects one of data compression circuits 168, 170, 172 with a switch 166 at predetermined intervals (or predetermined data numbers) while monitoring the count value of the address counter 164, and makes the data compression. The data compression circuits 168, 170, 172 compress the acoustic data with different compression methods or compression ratios. The compression method involves, for example, an adaptive differential PCM (ADPCM) or an adaptive delta modulation (ADM). The data compressed by the data compression circuit (e.g., circuit 168) is written again into an acoustic memory 162. Note that in the data compression, the addresses for the reading of data from the acoustic memory 162 and the writing of compressed data into the acoustic memory 162 are defined by the address counter 174.

The compression by the compression circuits 168, 170, 172 may be realized in different compression ratios in the same compression method or different compression methods.

For the compressed acoustic data, an error correction code generation circuit 176 generates an error correction code (CRC or read Solomon code) in a unit of a predetermined number of compression data. This error correction code is written at a predetermined address, along with the compression data stored in the acoustic memory 162. At this time, an address counter 174 is used.

The system control circuit 150 searches the recordable (unused) cluster from the search data of the memory card B if the acoustic data storable in one cluster of the memory card B is stored in the acoustic memory 162, and transfers an obtained cluster number via the interfaces 140, 144 to the memory control circuit 146 of the memory card B. The memory control circuit 146 sets a transferred cluster number to the cluster address pointer, and resets the memory address pointer pointing to the memory address with the cluster. The system control circuit 150 reads the acoustic data (compression data) and its error correction code from the acoustic memory 162 based on the address counter 178 and transfers them to the memory card B after transferring the cluster number and a predetermined waiting time.

The memory card B stores the transferred data at an address pointed to by the memory address pointer of the memory circuit 148, and increments the memory address pointer to prepare for the storage of next data. This operation is repeated until one cluster of data is stored in the memory circuit 148.

The system control circuit 150 transfers the management data to the memory card B if it confirms from the address counter 178 that one cluster of compressed acoustic data is transferred to the memory card B. This management data is stored in a predetermined area of the memory circuit 148. Thereby, the acoustic recording in the cluster is registered.

In this example, the image data compression circuit 128 and the acoustic data compression circuit 168, the image data compression circuit 130 and the acoustic data compression circuit 170, and the image data compression circuit 132 and the acoustic data compression circuit 172 rely on the compression method and/or the compression ratio with which the reproduction signal is provided at the substantially same quality. As will be detailed later, when the image and the voice are recorded in combination (for example, when they are fetched substantially at the same time, or the image or the voice is recorded subsequently), the voice is compressed by the data compression circuit 168 when the image is compressed by the data compression circuit 128, the voice is compressed by the data compression circuit 170 when the image is compressed by the data compression circuit 130, and the voice is compressed by the data compression circuit 172 when the image is compressed by the data compression circuit 132.

The basic operation of the reproduction system as shown in FIG. 30 will be described below. The operation for reproducing the image is as follows. The user designates the image reproduction and an image for the reproduction by the use of an operation switch 180. For example, when the image reproduction mode is selected with the operation switch 180, the start cluster number at which the image is recorded is displayed from the above described search data on the display unit 182, whereby the user designates a desired image for the reproduction with the operation switch 180. The system control circuit 150 transfers the start cluster number of the desired image for the reproduction via the interfaces 140, 144 to the memory control circuit 146. The memory control circuit 146 sets the transferred cluster number to a cluster address pointer, and resets a memory address pointer pointing to the memory address with the cluster. And it sequentially reads the data stored in the specified cluster while incrementing the memory address pointer, and transfers it via the interface 144 to the camera body A.

The system control circuit 150 resets the address counter 138 to point to the start address of the image memory 122, as well as placing the video output of a video signal processing circuit 198 in a mute state. Thereafter, the address counter 138 is incremented in synchronism with the data transfer from the memory card B, the data from the memory card B being sequentially written via the interface 140 into the image memory 122. If one cluster of image compression data (including the error correction code) is stored in the image memory 122, the system control circuit 150 determines whether or not there is any cluster storing subsequent data based on the search data as above described, in which if there is any cluster, the reading from that cluster and the storing into the image memory 122 are continued.

If one sheet of image compression data and its error correction code are stored in the image memory 122, an error detection/correction circuit 186 makes the error detection/correction with the error correction code, and writes the error corrected image compression data into the image memory 122. It should be noted that the error correction code which is added is removed in writing into the image memory 122. The addresses for the reading of data from the image memory 122 and the writing of data into the image memory 122 in making the error detection are defined by the address counter 126.

After the error correction, the system control circuit 150 investigates the compression method of the image from the management data, and selects one of the data expansion circuits 190, 192, 194, corresponding to the compression method, by using a switch 188. If there is no corresponding data expansion circuit, the user is warned on the display unit 182. The image compression data is read from the image memory 122 under the address control of the address counter 126, expanded by the data expansion circuit 190, 192, 194 selected by the switch 188, and written into the image memory 122.

At the time when the data expansion process is terminated, the system control circuit 150 releases the video signal processing circuit 198 from the mute state, and reads the image data from the image memory 122 based on the address counter 124. The address counter 124 increments the holding address in accordance with the timing pulse of the timing pulse generating circuit 116. A D/A converter 196 converts an image data from the image memory 122 into an analog signal in accordance with the timing pulse of the timing pulse generation circuit 116, and applies it to the video signal processing circuit 198. The video signal processing circuit 198 appends the synchronizing signal to the analog signal from the D/A converter 196 to be output as a standard form video signal to a video output terminal 200.

The acoustic reproduction operation will be described. The acoustic reproduction is made in either a case where it is designated by the operation switch 180, like the image reproduction, or a case where there is some acoustic recording in a combination with the image to be reproduced. The system control circuit 150 investigates the start cluster number of the voice designated by the operation switch 180, or the voice to be reproduced along with the image for the reproduction, based on the search data as above described, and transfers it via the interfaces 140, 144 to the memory control circuit 146. The memory control circuit 146 reads one cluster of data from the memory circuit 148, as in the image, and sends it out via the interface 144 to the camera body A. The system control circuit 150 places an acoustic signal processing circuit 214 in an output mute state, like the image reproduction.

The acoustic compression data and its error correction code from the memory card B are applied via the interface 140 to the acoustic memory 162, and stored sequentially into the acoustic memory 162 based on the address counter 178. The error detection/correction circuit 202 makes the error detection/correction with the error correction code, and writes the error corrected acoustic compression data into the acoustic memory 162. It should be noted that the error correction code which is added is removed in writing into the acoustic memory 162. The addresses for the reading of data from the acoustic memory 162 and the writing of data into the acoustic memory 162 in making the error detection are defined by the address counter 174.

After the error correction, the system control circuit 150 investigates the compression method of the voice from the management data, and selects one of the data expansion circuits 206, 208, 210, corresponding to the compression method, by using a switch 204. If there is no corresponding data expansion circuit, the user is warned on the display unit 182. The acoustic compression data is read from the acoustic memory 162 under the address control of the address counter 174, expanded by the data expansion circuit 206, 208, 210 selected by the switch 204, and written into the acoustic memory 162. Thereby, the original acoustic data is restored.

After the data expansion process is terminated, the acoustic data of the acoustic memory 162 is sequentially read under the control of the address counter 164. The address counter 164 increments the holding address in accordance with the timing pulse of the timing pulse generation circuit 160. A D/A converter 212 converts an acoustic data from the acoustic memory 162 into an analog signal in accordance with the timing pulse of the timing pulse generation circuit 160, and applies it to the acoustic signal processing circuit 214. The system control circuit 150 releases the acoustic signal processing circuit 214 from the mute state, which smoothes the analog acoustic signal from the D/A converter 212, and outputs it to an acoustic output terminal 216 by making the level adjustment if necessary.

The system control circuit 150 reads sequentially the recording data from the cluster having the voice stored, following the voice during the reproduction, and transfers it to the acoustic memory 162 to make the same processing as above described. This is repeated until the consecutive voice is terminated (or the clusters having a series of voice stored are all reproduced).

Figure 32:
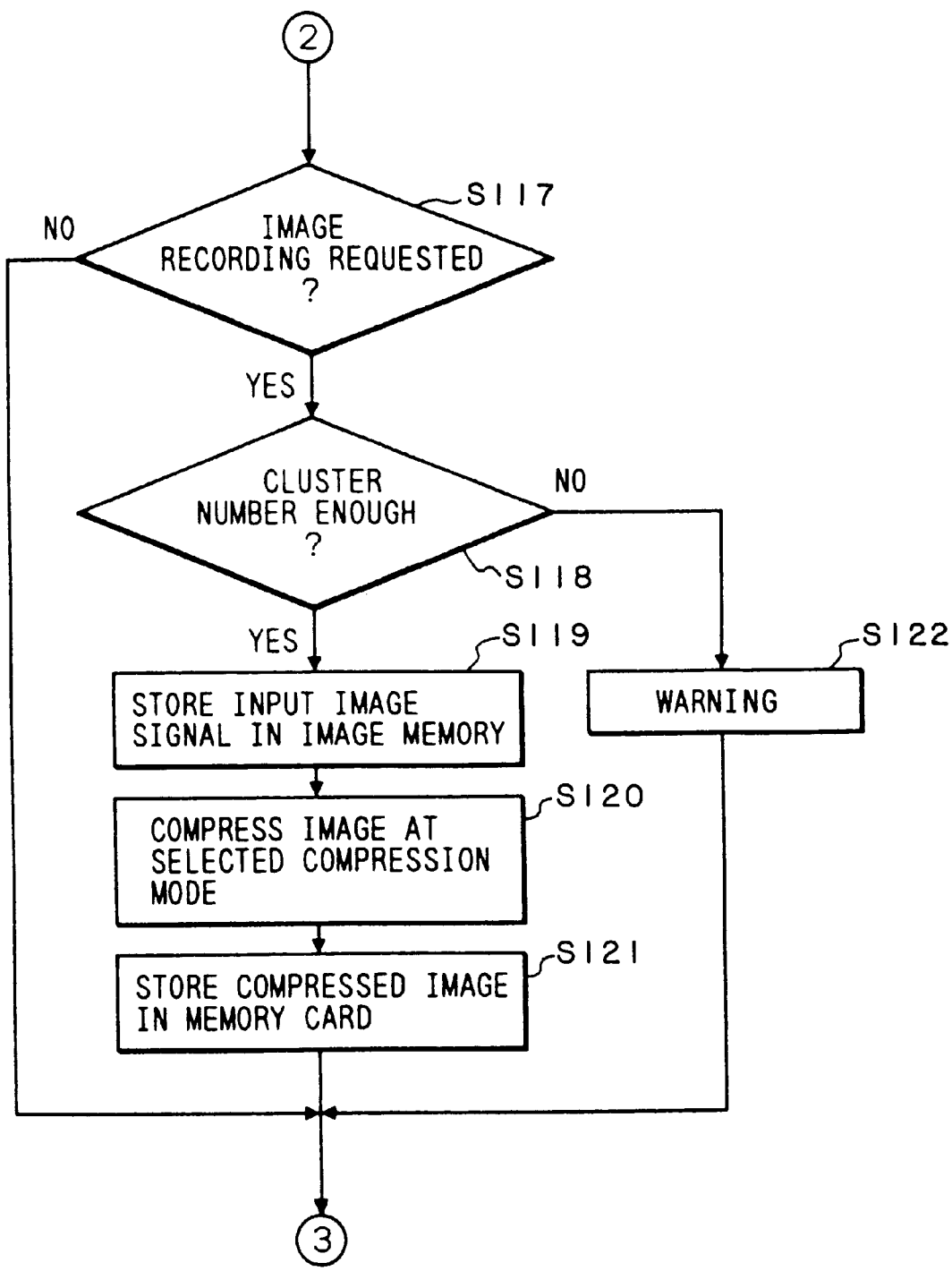
Figure 33:
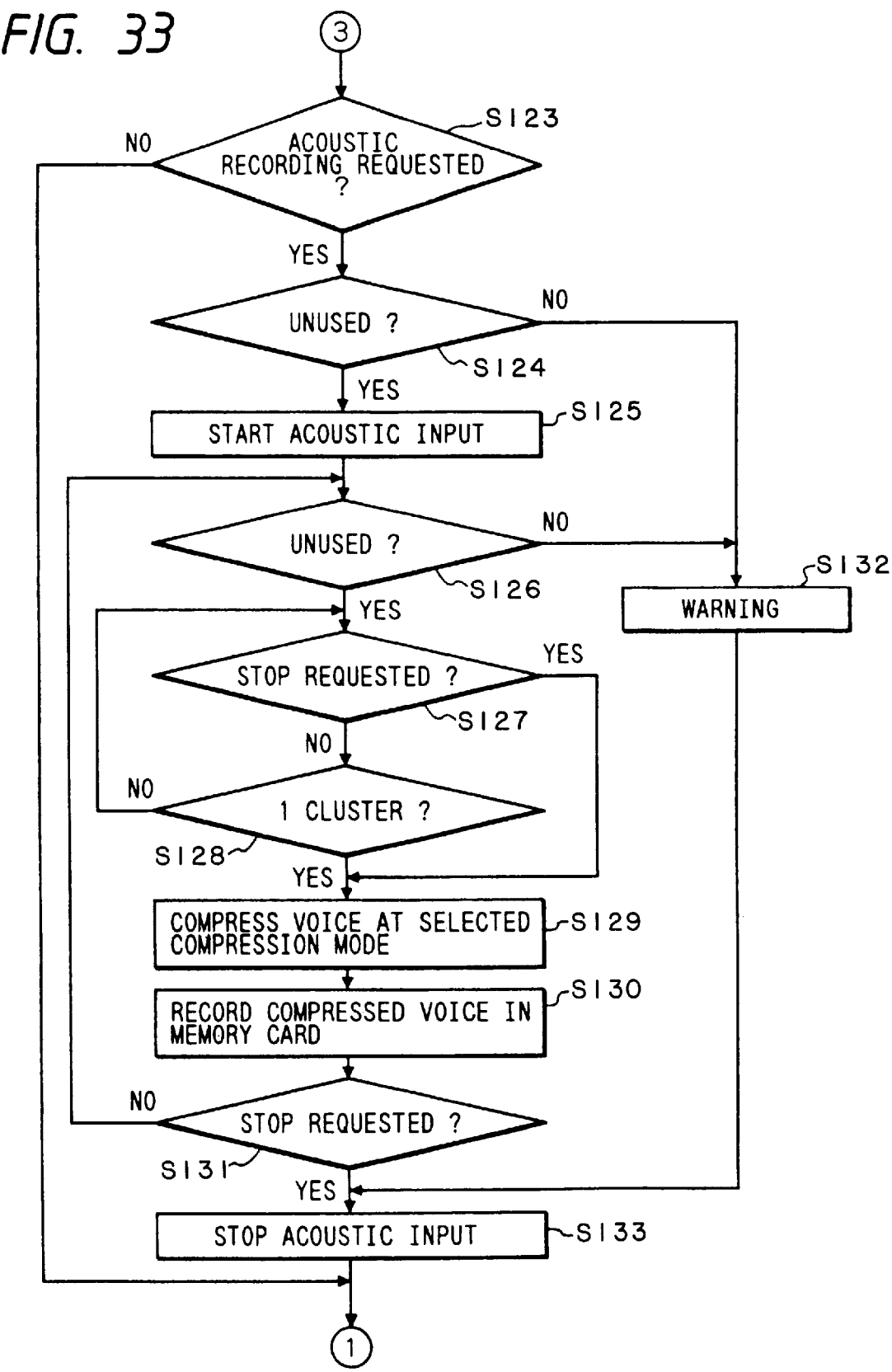

The recording operation of the system control circuit 150 will be described in detail. FIGS. 31, 32 and 33 show the flowchart of its operation as a whole.

Upon turning on the power, the system control circuit 150 initializes the flags and the control variables (S101), and confirms that the memory card B is set (S102). It reads the maintenance data from the memory card B (S103). And the system is naturally placed in a recording mode if all the clusters are unused, or a reproduction mode if there is no unused cluster (S104, S105). If there is any unused cluster, the system is placed in the reproduction mode or recording mode in accordance with an operation mode flag (S106).

When the operation mode flag is a recording mode, a determination is made whether or not the circuit system is at the operation condition in the recording mode (S107), and if not, the system is placed in a recording mode state (S108). For example, the video output and the acoustic output are placed in the mute state (S108).

If the state change of a compression mode changeover switch 184 is detected, the switches 134, 166 are changed in accordance with the designated compression mode #1, #2 or #3 to select the data compression circuits 128, 168; 130, 170; 132, 172 (S110, S111, S112, S113, S114, S115, S116).

Thereafter, the system waits for an image recording request or an acoustic recording request with the operation switch 180. For the image recording request (S117), a determination is made whether or not the number of unused clusters is enough to record the image in the image compression mode (S118). If it is enough, a picked up image with the image pickup device is stored in the image memory 122 (S119), compressed in a selected compression mode (S120), and recorded in the memory card B (S121). If not enough, a warning is displayed on the display unit 182 (S122).

For the acoustic recording request (S123), a determination is made whether or not there is any unused cluster (S124). If there is no unused cluster, a warning is displayed on the display unit 182, and the acoustic input is stopped (S132, S133). If there is any unused cluster, the system control circuit 150 places an acoustic input system in the operation condition to start the acoustic input into the acoustic memory 162 through the microphone 152 (S125).

If a stop request is input with the operation switch 180 (S127), or one cluster of acoustic data is input into the acoustic memory 162 (S128), the acoustic data in the acoustic memory 162 is compressed in the selected compression mode (S129), and the compressed acoustic data, together with its error correction code, is recorded in the memory card B (S130). If there is any stop request is input (S131), the acoustic input operation is stopped, while if there is no stop request (S131), the acoustic input and the recording into the memory card B are continued. If the unused cluster is exhausted (S126), a warning is displayed on the display unit 182, and the acoustic input operation is stopped (S132, S133).

While in the above example, the memory card is used as the recording medium of the information, it will be appreciated that the present invention is also applicable to a recording apparatus using a disk recording medium or tape recording medium.

As can be easily understood from the above description, with this example, the compression mode for the image and the voice is integrally set for a user's specification of the compression mode, so that it is possible to hold the compression ratio in a predetermined correspondence relation, including the compression method. Accordingly, the reproduced signal quality is held in a constant relation to mitigate or reduce a feeling of disorder at the reproduction.

What is claimed is:

1. A recording apparatus comprising:

a) an image information compressing means for inputting image information data, compressing the input image information data to produce compressed image information data according to an image information compressing mode of one kind selected from plural kinds of image information compressing modes, which plural kinds of modes differ from each other in data compressing ratio and in data compressing system, and outputting the compressed image information data produced;

b) an audio information compressing means for inputting audio information data, compressing the input audio information data to produce compressed audio information data according to an audio information compressing mode of one kind selected from plural kinds of audio information compressing modes, the plural kinds of modes differing from each other in data compressing ratio and in data compressing system, and outputting the compressed audio information data produced;

c) an information compressing mode instruction means for issuing an instruction as to which of the plural kinds of information compressing modes is to be used; and d) control means for controlling said image information compressing means so that said image information compressing means compresses the input image information data according to the image information compressing mode (from among said plural kinds of image information compressing modes) corresponding to the information compressing mode instructed by said information compressing mode instruction means, and controlling said audio information compressing means so that said audio information compressing means compresses the input audio information data according to the audio information compressing mode (from among said plural kinds of audio information compressing modes) corresponding to the information compressing mode instructed by said information compressing mode instruction means.

2. An apparatus according to claim 1, wherein said image information compressing means is arranged to perform the process of compressing the image information data according to ADCT (Adaptive Discrete Cosine Transfer) system.

3. An apparatus according to claim 1, further comprising a recording means for recording on a recording medium the compressed image information data outputted from said image information compressing means, and the compressed audio information data outputted from said audio information compressing means.

4. An apparatus according to claim 3, wherein said recording medium is a solid-state memory.

5. An apparatus according to claim 1, further comprising generating means for generating the image information data.

6. An apparatus according to claim 5, wherein said generating means includes an image pick-up device.

7. An apparatus according to claim 6, wherein said generating means includes an optical system for forming on the image pick-up device an image corresponding to an object.

8. A recording method comprising the steps of:

a) compressing image information to be recorded, using any of plural kinds of image information compressing modes for forming plural kinds of compressing information data of which information quantities are different from each other, and outputting resulting compressed image information data;

b) compressing audio information to be recorded, using any of plural kinds of audio information compressing produce compressed audio data according to an audio information compressing mode of one kind selected from plural kinds of modes differing from each other in data compressing ratio and in data compressing system, and outputting the compressed audio information data so produced;

c) instructing the information compression mode; and d) controlling performance of said compressing steps so as to compress the input image information data according to the information compressing mode (from among said plural kinds of image information compressing modes) corresponding to the information compressing mode instructed in said information compressing mode instructing step, and so as to compress the input audio information data according to the audio information compressing mode (from among said plural kinds of audio information compressing modes) corresponding to the information compressing mode instructed in said information compressing mode instructing step.

9. A method according to claim 8, wherein said image information compressing step is performed using a process of compressing the image information data according to an ADCT (Adaptive Discrete Cosine Transfer) system.

10. A method according to claim 8, further comprising the step of recording on a recording medium the compressed image information data outputted in said image information compressing step, and the compressed audio information outputted in said audio information compressing step.

11. A method according to claim 10, wherein said recording step records using a solid-state memory.

12. A method according to claim 8, further comprising the step of generating the image information data.

13. A method according to claim 12, wherein said generating step is performed using an image pick-up device.

14. A method according to claim 13, wherein said generating step further comprises the step of focusing on to the image image pick-up device an image corresponding to an object.

15. A recording apparatus, comprising:

(a) an image information converting means for inputting image information data, converting the input image information data to produce converted image information data according to an image information converting mode of one kind selected from plural kinds of image information converting modes for forming plural kinds of converted image information data which data quantities are different from each other, and outputting the converted image information data produced;

(b) an audio information converting means for inputting audio information data, converting the input audio information data according to an audio information converting mode for one kind selected from modes for forming plural kinds of converted audio information data which data quantities are different from each other, and outputting the converted audio information data produced;

(c) an information converting mode instruction means for issuing an instruction as to which of the plural kinds of information converting modes is to be used; and (d) control means for controlling said image information converting means so that said image information converting means converts the input image information data according to the image information converting mode (from among said plural kinds of image information converting modes) corresponding to the information converting mode instructed by said information converting mode instruction means, and controlling said audio information converting means so that said audio information converting means converts the input audio information data according to the audio information converting mode (from among said plural kinds of audio information converting modes) corresponding to the information converting mode instructed by said information converting mode instruction means.

16. An apparatus according to claim 15, wherein said image information converting means is arranged to perform the process of converting the image information data according to an ADCT (Adaptive Discrete Cosine Transfer) system.

17. An apparatus according to claim 15, further comprising a recording means for recording on a recording medium the converted image information data outputted from said image information converting means, and the converted audio information data outputted from said audio information converting meas.

18. an apparatus according to claim 17, wherein the recording medium comprises a solid-state memory.

19. An apparatus according to claim 15, further comprising generating means for generating the image information data.

20. An apparatus according to claim 19, wherein said generating means includes an image pick-up device.

21. An apparatus according to claim 20, wherein said generating means further comprises an optical system for forming on the image pick-up device an image corresponding to an object.

22. A recording method comprising the steps of:
  a) converting image information to be recorded, using any of plural kinds of image information converting modes for forming plural kinds of converted image information data which data quantities are different from each other, and outputting resulting converted image information data;
  b) converting audio information to be recorded, using any of plural kinds of audio information converting modes for forming plural kinds of converted audio information data which data quantities are different from each other, and outputting resulting converted audio information data;
  c) instructing the information converting mode; and
  d) controlling performance of said converting steps so as to convert the input image information data according to the image information converting mode (from among said plural kinds of image information converting modes) corresponding to the information converting mode instructed in said information converting mode converting mode instructing step, and so as to converted the input audio information data according to the audio information converting mode (from among said plural kinds of audio information converting modes) corresponding to the information converting mode instructed in said information converting mode instructed in said information converting mode instructing step.

23. A method according to claim 22, wherein said image information converting step is performed using a process of converting the image information data according to an ADCT (Adaptive Discrete Cosine Transfer) system.

24. An apparatus according to claim 22, further comprising the step of recording on a recording medium the converted image information data outputted in said image information converting step, and the converted audio information data outputted ins aid audio information converting step.

25. A method according to claim 24, wherein said recording stop records using a solid-state memory as the recording medium.

26. A method according to claim 22, further comprising the step of generating the image information data.

27. A method according to claim 26, wherein said Generating step is performed using an image pick-up device.

28. A method according to claim 27, wherein said generating step further comprises the stop of focusing on the image image pick-up device an image corresponding to an object.

* * * * *

UNITED STATES PATENT AND TRADEMARK OFFICE
CERTIFICATE OF CORRECTION

PATENT NO.   : 6,084,630
DATED        : July 4, 2000
INVENTOR(S)  : Yoichi Yamagishi et al.

It is certified that error appears in the above-identified patent and that said Letters Patent is hereby corrected as shown below:

Title page, Item [54], Title
"MULTIMODE" should read -- MULTIMODE IMAGE --.

Sheet 7,
Figure 7, "PRIVENTED" should read -- PREVENTED --.

Sheet 20,
Figure 20, "HEADDER" (both occurrences) should read -- HEADER --.

Sheet 28,
Figure 27, "HEADDER" should read -- HEADER; and "DIRECTRY" should read -- DIRECTORY --.

Column 1,
Line 1, "MULTIMODE" should read -- MULTIMODE IMAGE --.

Column 4,
Line 16, "with," should be deleted.

Column 7,
Line 27, "search" should read -- searches --.

Column 9,
Line 1, "informations" should read -- information --.

Column 13,
Line 15, "Area" should read -- area --.

Column 21,
Line 42, "voice" should read -- voices --.

UNITED STATES PATENT AND TRADEMARK OFFICE
CERTIFICATE OF CORRECTION

PATENT NO.   : 6,084,630
DATED          : July 4, 2000
INVENTOR(S) : Yoichi Yamagishi et al.

It is certified that error appears in the above-identified patent and that said Letters Patent is hereby corrected as shown below:

<u>Column 24,</u>
Line 18, "on to" should read -- onto --;
Line 67, "meas." should read -- means. --.

<u>Column 25,</u>
Line 1, "an" should read -- An --.

<u>Column 26,</u>
Line 2, "converted" should read -- convert --.;
Line 18, "ins aid" should read -- in said --;
Line 25, "Gen-" should read -- gen --;
Line 28, "stop" should read -- step --.

Signed and Sealed this

Twenty-fifth Day of September, 2001

Attest:

*Nicholas P. Godici*

NICHOLAS P. GODICI
*Attesting Officer*   *Acting Director of the United States Patent and Trademark Office*